(12) United States Patent
Terabe et al.

(10) Patent No.: US 12,213,165 B2
(45) Date of Patent: Jan. 28, 2025

(54) CONTROL APPARATUS FOR SCHEDULING RADIO RESOURCES

(71) Applicant: KDDI CORPORATION, Tokyo (JP)

(72) Inventors: Shigeo Terabe, Tokyo (JP); Toshiaki Yamamoto, Tokyo (JP); Hayato Fukuda, Tokyo (JP); Yuu Tsukamoto, Fujimino (JP); Haruhisa Hirayama, Fujimino (JP); Shinobu Nanba, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 425 days.

(21) Appl. No.: 17/584,546

(22) Filed: Jan. 26, 2022

(65) Prior Publication Data
US 2022/0150915 A1 May 12, 2022

Related U.S. Application Data

(63) Continuation of application No. PCT/JP2020/028967, filed on Jul. 29, 2020.

(30) Foreign Application Priority Data

Jul. 29, 2019 (JP) .................................. 2019-138893
Jul. 29, 2019 (JP) .................................. 2019-138894

(51) Int. Cl.
*H04W 72/543* (2023.01)
*H04W 72/52* (2023.01)
*H04W 72/566* (2023.01)

(52) U.S. Cl.
CPC ......... *H04W 72/543* (2023.01); *H04W 72/52* (2023.01); *H04W 72/566* (2023.01)

(58) Field of Classification Search
CPC . H04W 72/543; H04W 72/52; H04W 72/566; H04W 72/54; H04W 16/04; H04W 72/53; H04W 88/08
See application file for complete search history.

(56) References Cited

U.S. PATENT DOCUMENTS

| 10,264,461 | B2 * | 4/2019 | Aijaz | ................... H04W 16/10 |
| 2015/0358829 | A1 * | 12/2015 | Arnott | .................. H04W 16/14 |
| | | | | 455/454 |

(Continued)

FOREIGN PATENT DOCUMENTS

| JP | 2017-200172 A | 11/2017 |
| JP | 2018-518109 A | 7/2018 |
| WO | WO-2017/168112 A1 | 10/2017 |

OTHER PUBLICATIONS

Extended European search report corresponding to European Patent Application No. 20847526.9, dated Aug. 4, 2022 (10 pages).

(Continued)

*Primary Examiner* — Ivan O Latorre
(74) *Attorney, Agent, or Firm* — Foley & Lardner LLP

(57) ABSTRACT

A plurality of schedulers each corresponding to one or more slices perform, in a same cell formed by one RU, scheduling of radio resources for a UE that uses a corresponding slice. A RAN controller identifies, for each of a plurality of schedulers, an amount of radio resources required for each scheduler in a predetermined period T, based on an amount of data and a communication quality of wireless communication by the UE in the cell. The RAN controller further allocates, to each of the plurality of schedulers, the identified amount of radio resources and a margin of radio resources that can be used for the scheduling.

15 Claims, 12 Drawing Sheets

(56) References Cited

U.S. PATENT DOCUMENTS

| | | | |
|---|---|---|---|
| 2017/0085493 A1* | 3/2017 | Senarath | H04L 47/522 |
| 2018/0152958 A1* | 5/2018 | Arnold | H04L 41/5009 |
| 2019/0123963 A1* | 4/2019 | Tang | H04L 45/64 |
| 2020/0367109 A1* | 11/2020 | Chen | H04W 28/18 |
| 2021/0211942 A1* | 7/2021 | Guo | H04W 28/24 |

OTHER PUBLICATIONS

Ksentini, et al., "Toward Enforcing Network Slicing on RAN: Flexibility and Resources Abstraction," IEEE Communications Magazine, Jun. 2017, vol. 55, Issue 6, pp. 102-108.

Samsung, "Slicing: Requirements for RAN", 3GPP TSG-RAN WG2 NR R2-1700380, [online], Jan. 6, 2017, pp. 1-4, retrieved on Aug. 12, 2020 from the Internet: <URL:https://www.3gpp.org/ftp/tsg_ran/WG2_RL2/ TSGR2_AHs/2017_01_NR/Docs/R2-1700380.zip>, 2.2 LAN Support for network slicing 2.2 LAN Support for network slicing.

* cited by examiner

FIG. 7A

UE INFORMATION OF DU#1 (SLA#1, #2)

| UE | SLA | AMOUNT OF DATA [BYTES] | S/N [dB] | NECESSARY RADIO RESOURCES [PRB] | NECESSARY MARGIN [PRB] |
|---|---|---|---|---|---|
| UE#1 | SLA#1 | 100 | 15 | 130 | 26 |
| UE#2 | SLA#1 | 0 | 20 | 0 | 20 |
| UE#3 | SLA#2 | 20 | 3 | 1000 | 100 |
| UE#4 | SLA#2 | 60 | 10 | 170 | 17 |

UE INFORMATION OF DU#2 (SLA#3)

| UE | SLA | AMOUNT OF DATA [BYTES] | S/N [dB] | NECESSARY RADIO RESOURCES [PRB] | NECESSARY MARGIN [PRB] |
|---|---|---|---|---|---|
| UE#5 | SLA#3 | 100 | 12 | 700 | 350 |
| UE#6 | SLA#3 | 0 | 10 | 0 | 500 |
| UE#7 | SLA#3 | 20 | 18 | 400 | 200 |

FIG. 7B

MARGIN INFORMATION

| SLA | MULTIPLICATION VALUE |
|---|---|
| SLA#1 | 0.2 |
| SLA#2 | 0.1 |
| SLA#3 | 0.5 |

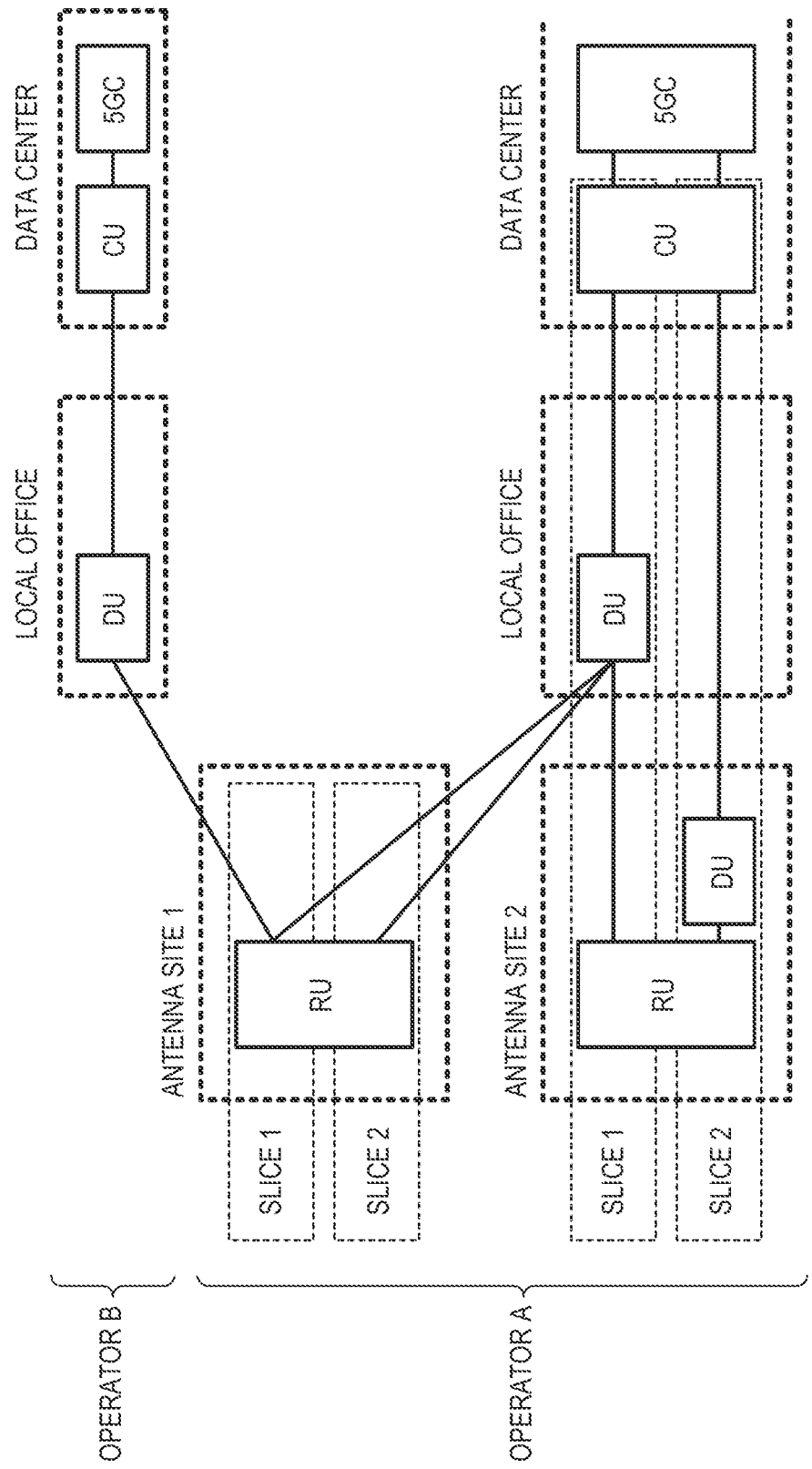

F I G. 12

AMC MAPPING TABLE EXAMPLE

| CQI | Modulation Scheme | Coding rate | SINR (dB) | Spectral efficiency (bps/Hz) |
|---|---|---|---|---|
| 0 | - | - | - | - |
| 1 | QPSK | 0.076 | -7.27 | 0.1523 |
| 2 | QPSK | 0.12 | -4.76 | 0.2344 |
| 3 | QPSK | 0.19 | -2.06 | 0.377 |
| 4 | QPSK | 0.30 | 0.61 | 0.6016 |
| 5 | QPSK | 0.44 | 2.81 | 0.877 |
| 6 | QPSK | 0.59 | 4.69 | 1.1758 |
| 7 | 16QAM | 0.37 | 6.29 | 1.4766 |
| 8 | 16QAM | 0.48 | 8.69 | 1.9141 |
| 9 | 16QAM | 0.60 | 11.37 | 2.4063 |
| 10 | 64QAM | 0.45 | 13.11 | 2.7305 |
| 11 | 64QAM | 0.55 | 16.44 | 3.3223 |
| 12 | 64QAM | 0.65 | 19.62 | 3.9023 |
| 13 | 64QAM | 0.75 | 23.01 | 4.5234 |
| 14 | 64QAM | 0.85 | 26.19 | 5.1152 |
| 15 | 64QAM | 0.93 | 28.66 | 5.5547 |

CONTROL APPARATUS FOR SCHEDULING RADIO RESOURCES

CROSS-REFERENCE TO RELATED APPLICATION(S)

This application is a continuation of International Patent Application No. PCT/JP2020/028967 filed on Jul. 29, 2020, which claims priority to and the benefit of Japanese Patent Application No. 2019-138893 filed on Jul. 29, 2019, and Japanese Patent Application No. 2019-138894, filed on Jul. 29, 2019, the entire disclosures of which are incorporated herein by reference.

TECHNICAL FIELD

The present invention relates to a control apparatus and a control method for a base station system in which network slicing is applied, and to a program for the control apparatus.

BACKGROUND ART

In fifth generation (5G) mobile communication systems, service types are broadly classified into three categories, namely high-capacity (eMBB; enhanced Mobile BroadBand), ultra-low latency (URLLC; Ultra-Reliable and Low Latency Communications), and multi-connectivity (mMTC; massive Machine Type Communications), each of which has different service requirements. Network slicing is being considered in order to provide services with such different requirements in an economical and flexible manner.

In 5G, for which the first version of the specification was developed as 3GPP Release 15, a base station is constituted by a logical node called a Distributed Unit (DU) and a logical node called a Central Unit (CU), and a functional division of the base station between the DU and the CU is employed. Of the base station functions (RF (Radio Frequency layer), PHY (Physical layer), MAC (Media Access Control layer), RLC (Radio Link Control layer), and PDCP (Packet Data Convergence Protocol layer), in order from the lower layer), the lower-layer functions are provided in the DU, and the other upper-layer functions are provided in the CU.

When the network slicing described above is applied in a base station system having this type of functional division into DUs and CUs, a plurality of schedulers, each corresponding to at least one slice, are provided in different DUs. Each scheduler schedules radio resources for wireless terminals in at least one corresponding slice. In a configuration where a plurality of DUs share a single radio unit (RU) having functions such as RF, PHY, and the like, a plurality of schedulers will use common radio resources for scheduling in the same base station cell. It is therefore necessary to realize radio resource isolation so that contention for the radio resources to be used does tot occur between schedulers (between slices). Non-patent literature (NPL) 1, A. Ksentini and N. Nikaein, "Toward Enforcing Network Slicing on RAN: Flexibility and Resources Abstraction," IEEE Communications Magazine, June 2017, vol. 55, issue 6, pp. 102-108, proposes a technique to allocate radio resources for scheduling to each of slices on the basis of a predetermined distribution ratio to ensure isolation between slices when network slicing is applied.

In a base station system such as the one described above, it is necessary to allocate radio resources for scheduling to each scheduler such that the radio resources can be used more appropriately for scheduling to wireless terminals while maintaining the quality of service provided by each slice.

SUMMARY OF THE INVENTION

The present invention provides a technique for more appropriately allocating radio resources for scheduling to each of schedulers (each of slices) in a base station system in which network slicing is applied.

According to one aspect of the present invention, there is provided a control apparatus that controls radio resources used by a scheduler performing scheduling for allocating radio resources to a wireless terminal, the control apparatus comprising: an identification unit configured to identify, for each of a plurality of schedulers that each corresponds to one or more slices and that perform, in a same cell formed by one radio unit, scheduling of radio resources for a wireless terminal that uses a corresponding slice, an amount of radio resources required for each scheduler in a predetermined period, on the basis of an amount of data and a communication quality of wireless communication by the wireless terminal in the cell; and an allocation unit configured to allocate, to each of the plurality of schedulers, the amount of radio resources identified by the identification unit and a margin of radio resources that can be used for the scheduling.

According to the present invention, radio resources for scheduling can be more appropriately allocated to each of schedulers (each of slices) in a base station system in which network slicing is applied.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 7A is a diagram illustrating an example of UP information used by the RAN controller.

FIG. 7B is a diagram illustrating an example of margin information used by the RAN controller.

FIG. 9 is a diagram illustrating other examples of the arrangement of CUs, DUs, and RUs in the base station system.

FIG. 12 is a diagram illustrating an example of an Adaptive Modulation and Coding (AMC) mapping table for obtaining a predicted throughput.

DESCRIPTION OF THE EMBODIMENTS

Figure 1:
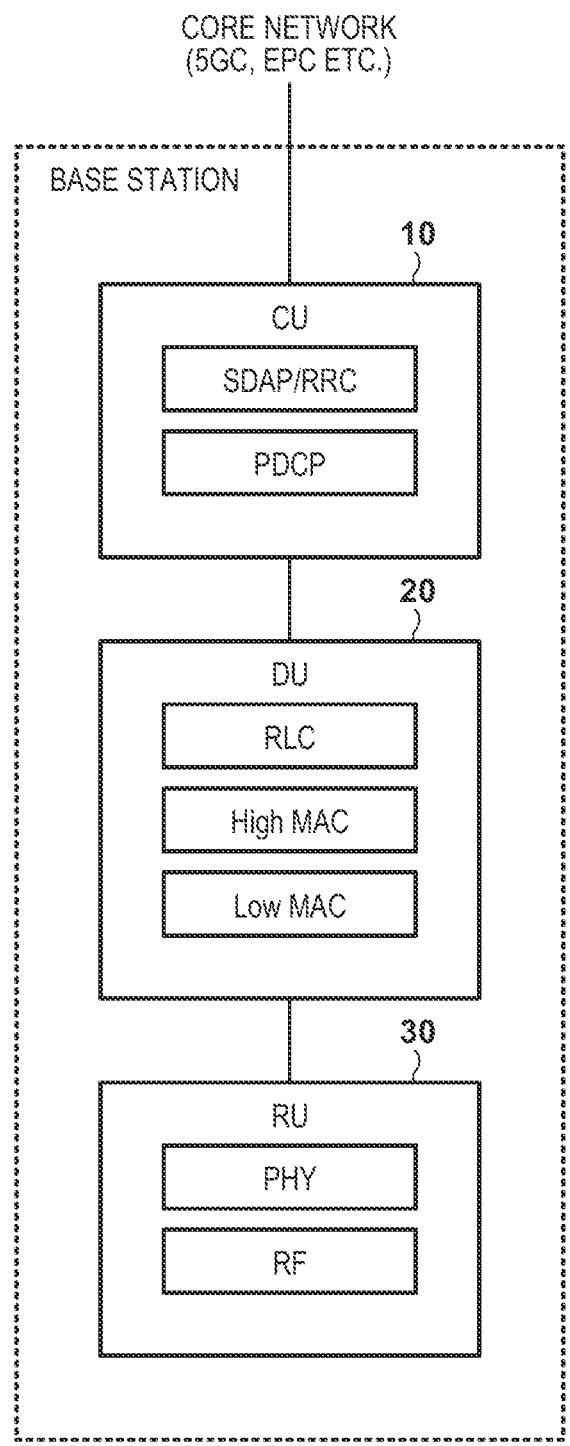
FIG. 1 is a diagram illustrating examples of the functional configurations of a CU, a DU, and an RU in a base station system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<Functional Division of Base Station>

A base station (base station system) generally has a plurality of functions (RF, . . . , PDCP), from lower-layer functions to upper-layer functions, and these functions are divided and arranged into DUs and CUs.

FIG. 1 illustrates an example of a configuration in which a plurality of functions of different layers of a base station are divided into CUs, DUs and RUs. As illustrated in FIG. 1, in the present embodiment, in addition to CUs and DUs, RUs having functions such as RF, PHY, and the like are provided. The base station (base station system) in FIG. 1 is constituted by a CU 10, a DU 20, and an RU 30, where the CU 10 is connected to a core network (5GC (5G Core), EPC (Evolved Packet Core), or the like), and the DU 20 is connected between the CU 10 and the RU 30.

Of the functions of the base station, the DU 20 has at least a scheduling function that schedules the allocation of radio resources to wireless terminals. Of the functions of the base station, the CU 10 has higher-layer functions than the functions of the connected DU 20. Of the functions of the base station, the RU 30 has at least an RF function, which corresponds to a function of transmitting and receiving radio waves.

In the configuration example in FIG. 1, the DU 20 has not only a High MAC function, which corresponds to the scheduling function, but also RLC and Low MAC functions, whereas the CU 10 has the SDAP (Service Data Adaptation Protocol layer)/RRC (Radio Resource Control layer) and PDCP functions, which are higher-layer functions than the functions of the DU 20. The RU 30 has not only the RF function, which corresponds to a function of transmitting and receiving radio waves, but also a PHY function. Only some of the PHY functions may be provided in the RU 30, with the rest of the PHY functions being provided in the DU 20.

As described above, in a base station system in which network slicing is applied, it is necessary to allocate radio resources for scheduling to each scheduler such that the radio resources can be used for scheduling to wireless terminals without waste while maintaining the quality of service provided by each slice. However, the amount of radio resources required for each of the plurality of schedulers varies depending on the amount of communication data and radio communication quality of the wireless terminals subject to the scheduling. Accordingly, if, for example, the radio resources are allocated to each scheduler in a fixed manner, a situation may arise in which one of the schedulers has insufficient or excessive radio resources.

In addition, if any of the schedulers cannot secure the radio resources necessary for scheduling, a situation may arise where the service itself cannot be provided to the wireless terminals. For example, it is necessary for the scheduler to be able to allocate radio resources appropriately for wireless terminals that access slices which provide mission-critical services.

Accordingly, the present embodiment provides a technique that makes it possible to allocate an amount of radio resources to a plurality of schedulers suitable for scheduling radio resources within a predetermined period, and enables each scheduler to secure radio resources more appropriately. In the following, the configuration and operations of the base station system, and control of the base station system, according to the present embodiment will be described in detail using the functional configuration illustrated in FIG. 1 as an example.

<Configuration of Base Station System>

Figure 2:
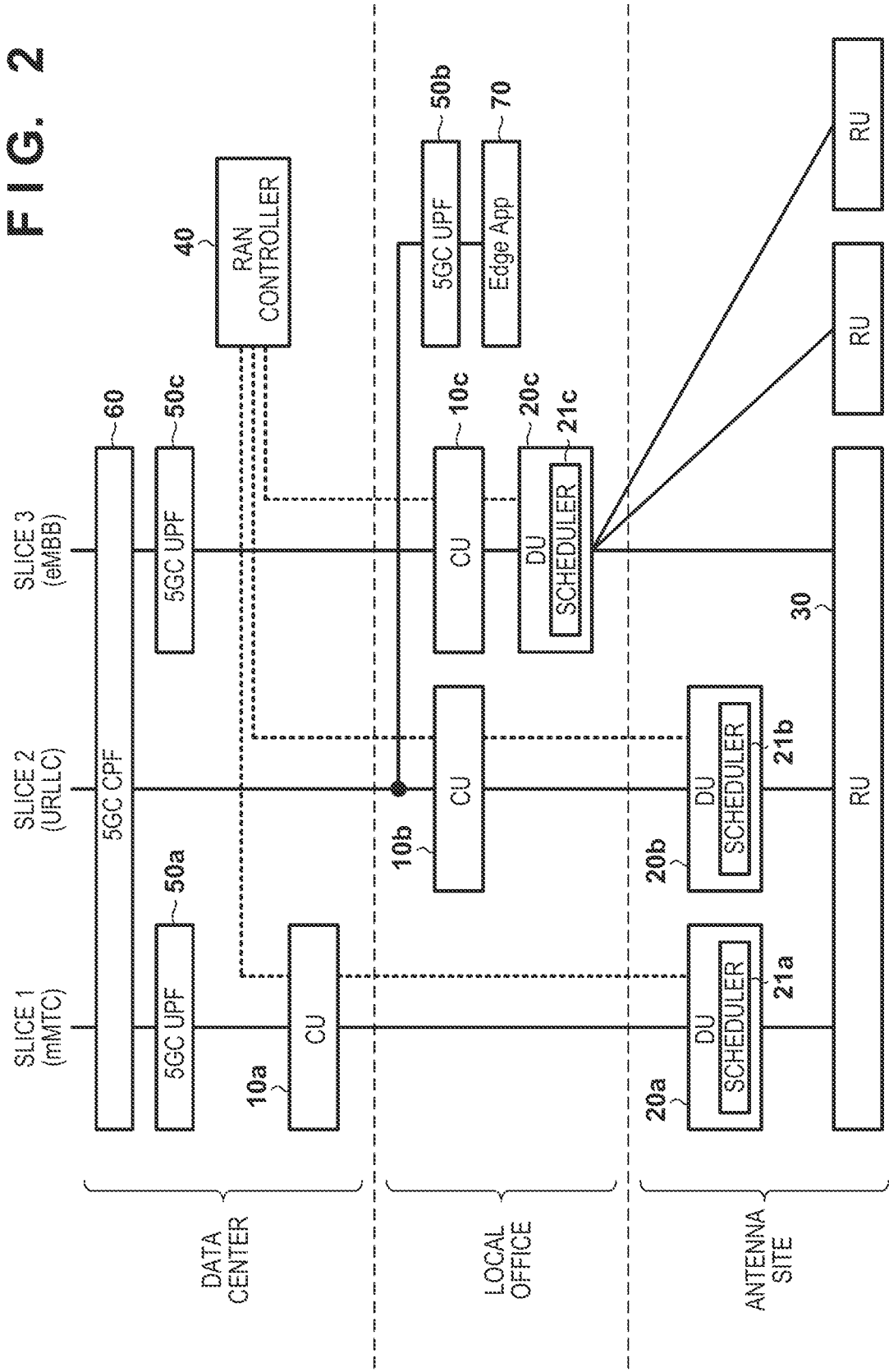
FIG. 2 is a diagram illustrating an example of the configuration of the base station system.

FIG. 2 illustrates an example of the basic configuration of a base station system in which slices 1 to 3, corresponding to mMTC, URLLC, and eMBB serving as service types, have been generated. Note that the CU 10 and the DU 20 are controlled and managed by a radio access network (RAN) controller 40, and each slice is generated by the RAN controller 40.

The base station system is constituted by one or more of the plurality of CUs 10 (10*a*, 10*b*, 10*c*), one or more of the plurality of DUs 20 (20*a*, 20*b*, 20*c*), and one RU 30. The CU 10*a* and the DU 20*a* correspond to slice 1, the CU 10*b* and the DU 20*b* correspond to slice 2, and the CU 10*c* and the DU 20*c* correspond to slice 3. In this manner, the plurality of CUs 10 correspond to different slices, and the same is true for the plurality of DUs 20 corresponding to the plurality of CUs 10. Note that the plurality of CUs 10 may each correspond to one or more slices. Likewise, note that the plurality of DUs 20 may each correspond to one or more slices.

Of the functions of the base station, the DUs 20 have at least a radio resource scheduling function (e.g., the High MAC function). The DUs 20 are placed at an antenna site or (a local office) between the antenna site and a data center, respectively.

The CUs 10 are placed between respectively different ones of the DUs 20 and a core network, and of the functions of the base station, have higher-layer functions (e.g. SDAP/RRC and PDCP functions) than the functions of the one DU connected thereto. In the example of FIG. 2, the CUs 10*a*, 10*b*, and 10*c* are connected to different ones each of the DUs 20*a*, 20*b*, and 20*c*.

Of the functions of the base station, the single RU 30 has at least a function of transmitting and receiving radio waves (e.g., an RF function). The RU 30 is placed at the antenna site and is connected to the plurality of DUs 20. Accordingly, the plurality of slices 1 to 3 provided via the plurality of DUs 20 are provided within the same cell formed by the stated RU 30.

In this manner, the base station system of the present embodiment is constituted by a CU 10 and a DU 20 corresponding to each of the slices 1 to 3, and a single RU 30 connected to the plurality of DUs 20 and placed at the antenna site. In other words, the base station system has a configuration in which a plurality of DUs and CUs are connected to a single RU (i.e., the RU is common for the plurality of DUs and CUs) without providing an RU for each slice. This enables a single RU to accommodate a plurality of services (slices).

In the present embodiment, the core network or RAN is provided with the RAN controller 40, which is a control apparatus that controls the functions of the RAN. The RAN controller 40 is communicatively connected to the base station system on the RAN. The RAN controller 40 configures (generates) the slices 1 to 3, which correspond to the service requirements, for one or more of the plurality of CUs 10 (10a, 10b, 10c) and one or more of the plurality of DUs 20 (20a, 20b, 20c) on the RAN. Note that in the present embodiment, the RAN controller 40 functions as an example of a control apparatus that controls radio resources used by a scheduler that performs scheduling for allocating the radio resources to wireless terminals.

The configuration example in FIG. 2 assumes a 5G network configuration as an example, and a 5GC Control Plane Function (5GC CPF) 60 is a group of control processing functions for a 5G core network. 5G Core User Plane Functions (5GC UPF) 50 (50a, 50b, 50c) are a group of data processing functions of the 5G core network, and are provided for each slice. The 5GC UPF 50a corresponds to slice 1, the 5GC UPF 50b corresponds to slice 2, and the 5GC UPF 50c corresponds to slice 3.

In the configuration example in FIG. 2, corresponding CUs 10 and DUs 20 are placed differently according to the slice (service). The performance of inter-base station linkages (inter-cell coordination), the amount of delay imparted on applications, the network utilization efficiency, and the like will differ depending on the placement of the CUs 10 and the DUs 20. Accordingly, the configuration example in FIG. 2 illustrates an arrangement of CUs 10 and DUs 20 suited to each slice (service).

For slice 1 (an mMTC slice), the CU 10a is placed at the data center where the core network is located, and the DU 20a is placed at the antenna site. This is to enable the efficient use of computing resources in the data center through the statistical multiplexing effect.

For slice 2 (a URLLC slice), the CU 10b is placed at the local office, and the DU 20b is placed at the antenna site. This makes it possible to introduce Multi-Access Edge Computing (MEC) and achieve lower latency. In the present embodiment, the CU 10b is connected to an Edge Application Server (Edge App) 70, which is an edge server, placed at an edge site, which has applications for providing low-latency services. Note that the edge site where the Edge App 70 is placed may be the local office where the CU 10b is placed.

For slice 3 (an eMBB slice), both the CU 10c and the DU 20c are placed at the local office. This makes it possible to connect the DU 20c to a plurality of RUs 30, each placed at a different antenna site. In the configuration example in FIG. 2, the DU 20c is connected to a plurality of RUs 30, each of which forms a different cell, and performs processing for inter-cell coordination (e.g., Coordinated Multi-Point Transmission/reception (CoMP)) among the connected RUs.

Enabling inter-cell coordination in this manner makes it possible to improve the radio communication quality.

As illustrated in FIG. 2, the DUs 20a, 20b, and 20c include schedulers 21a, 21b, and 21c, respectively, which perform scheduling for allocating radio resources to wireless terminals. In the configuration example in FIG. 2, the schedulers 21a and 21b, which correspond to slices 1 and 2, are placed at the antenna site, and the scheduler 21c, which corresponds to slice 3, is located in the local office. In this manner, the schedulers 21a and 21b, and the scheduler 21c, are placed at different locations.

The DUs 20a, 20b, and 20c, which include the schedulers 21a, 21b, and 21c, respectively, are connected to a common RU 30, as described above. The schedulers 21a, 21b, and 21c perform scheduling for wireless terminals that use corresponding slices, using common radio resources which can be used in the same cell turned by the common RU 30. The radio resources used for scheduling by each of the schedulers 21a, 21b, and 21c are allocated in advance by the RAN controller 40.

<Device Configuration>

Figure 3:
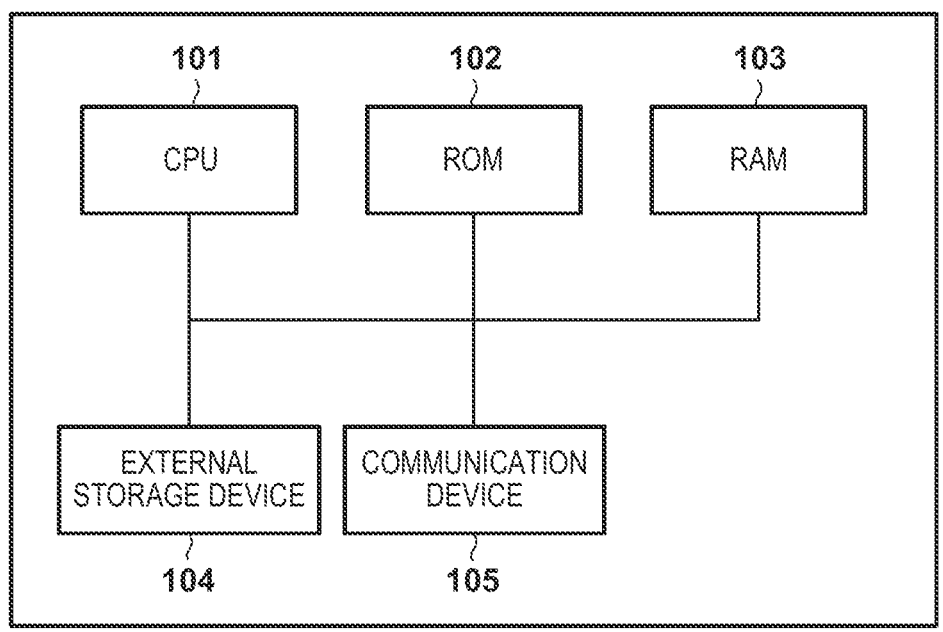
FIG. 3 is a block diagram illustrating an example of the hardware configuration of a RAN controller.

The RAN controller 40 has the hardware configuration illustrated in FIG. 3 as an example. Specifically, the RAN controller 40 includes a CPU 101, ROM 102, RAM 103, an external storage device 104 such as an HDD, and a communication device 105.

In the RAN controller 40, the CPU 101 executes programs which realize each function of the RAN controller 40 and which are stored, for example, in one of the ROM 102, the RAM 103, or the external storage device 104. Note that the CPU 101 may be replaced with one or more processors such as an Application-Specific Integrated Circuit (ASIC), a Field Programmable Gate Array (FPGA), a Digital Signal Processor (DSP), or the like.

The communication device 105 is a communication interface for communication with external apparatuses to be controlled, such as the CUs 10 and the DUs 20, under the control of the CPU 101. The RAN controller 40 may include a plurality of communication devices 105, each connected to a different destination.

Note that the RAN controller 40 may include dedicated hardware for executing the various functions described later, or some functions may be executed by hardware, with the rest executed by a computer running programs. Alternatively, all functions may be executed using a computer and programs.

The CUs 10, the DUs 20, and the RU 30 may also have hardware configurations such as those illustrated in FIG. 3. However, as the communication device 105, the RU 30 includes a wireless communication interface for wireless communication with wireless terminals in addition to the communication interface for communication with each of the DUs 20.

Figure 4:
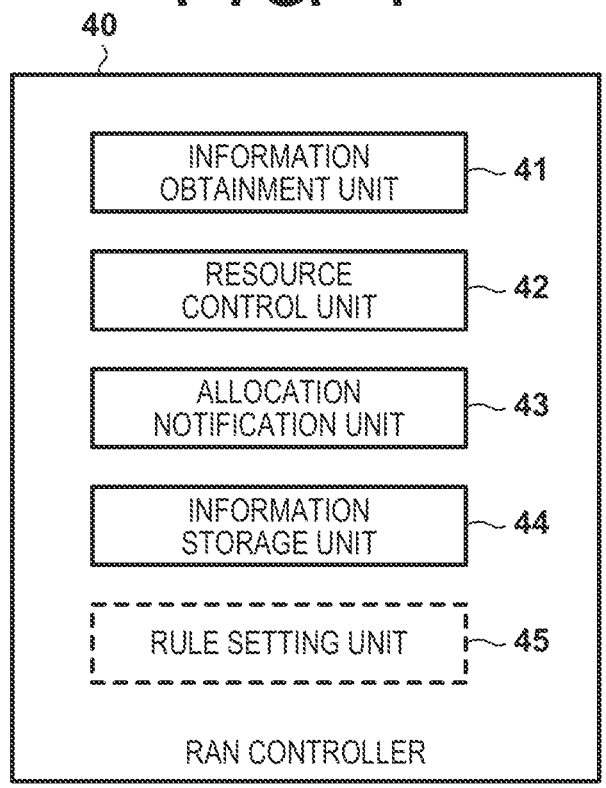
FIG. 4 is a block diagram illustrating an example of the functional configuration of the RAN controller.

FIG. 4 is a block diagram illustrating an example of the functional configuration of the RAN controller 40. The RAN controller 40 of the present embodiment includes an information obtainment unit 41, a resource control unit 42, an allocation notification unit 43, and an information storage unit 44. In the present embodiment, these functional units are realized by the CPU 101, as a result of the CPU 101 executing control programs, but dedicated hardware may be provided to realize each functional unit. Note that of the functions of the RAN controller 40, only the functional units related to the allocation of radio resources to each scheduler 21 (each DU 20) (i.e., the allocation of radio resources used for scheduling for each slice, for each of the plurality of slices) are illustrated in FIG. 4, and the functional units related to other functions are not illustrated. A rule setting unit 45 illustrated in FIG. 4 is provided in the RAN controller 40 in a third embodiment, which will be described later.

The information obtainment unit 41 obtains information necessary for the allocation (distribution) of radio resources to each scheduler 21 by the resource control unit 42 from at least one of the CU 10, the DU 20 and the RU 30. For example, the information obtainment unit 41 obtains the amount of communication data and communication quality for one or more wireless terminals that access the slice corresponding to each DU 20, The information Obtainment unit 41 stores the obtained information in the information storage unit 44.

The resource control unit 42 controls the radio resources used by each scheduler 21 by performing processing for allocating radio resources for scheduling to each scheduler 21 (each DU 20) on the basis of the information obtained by the information obtainment unit 41. In addition to allocating radio resources, the resource control unit 42 also allocates the margin of radio resources that each scheduler 21 can use for scheduling.

The allocation notification unit 43 transmits a notification indicating the allocation of radio resources and margins to each scheduler 21 (each DU 20) according to the results of the allocation of radio resources and margins to each scheduler 21 (each DU 20) by the resource control unit 42. This completes the allocation of radio resources and margins to the plurality of schedulers 21 (the plurality of DUs 20).

The information storage unit 44 corresponds to a database provided in a storage device (e.g., the RAM 103 or the external storage device 104), and stores the information obtained by the information obtainment unit 41 and information used for processing by the resource control unit 42.

<Radio Resource and Margin Allocation Processing>

In the present embodiment, the RAN controller 40 allocates (distributes) radio resources to each scheduler 21 at predetermined time intervals. In addition to allocating radio resources, the RAN controller 40 also allocates, to each scheduler 21, the margin of radio resources that can be used for scheduling when there are insufficient radio resources.

Here, in base station system architecture such as that of the present embodiment, schedulers can be placed at different locations (sites). In the configuration example in FIG. 2, the scheduler 21c is placed in a location different from the schedulers 21a and 21b. When a plurality of schedulers corresponding to different slices are placed at different locations, it is difficult to update the allocation of radio resources to each scheduler 21 at each transmission time interval (TTI), which is generally the minimum unit of time for scheduling. For this reason, the RAN controller 40 allocates (updates the allocation of) radio resources to each scheduler 21 at time intervals longer than the TTI (e.g., 100 TTIs).

Figure 5:
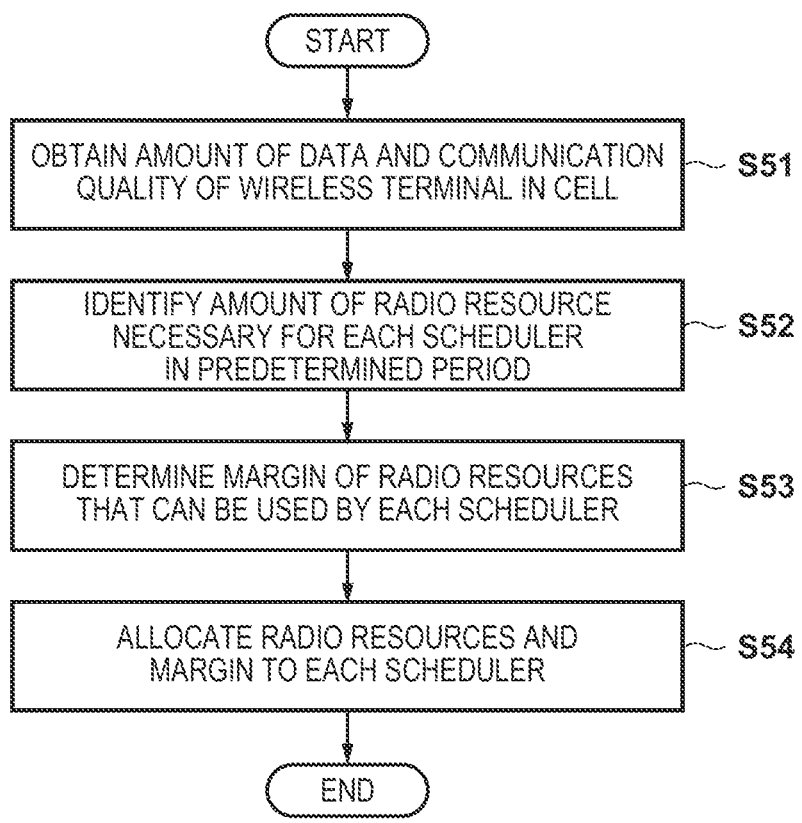
FIG. 5 is a flowchart illustrating a sequence of processing executed by the RAN controller.

FIG. 5 is a flowchart illustrating the sequence of allocation processing performed by the RAN controller 40 according to the present embodiment. This allocation processing is performed at least when setting a slice for a wireless terminal (UE) in the cell formed by the RU 30, or at the timing of every predetermined period T. The predetermined period T corresponds to the time interval described above, during which the allocation of radio resources to each scheduler 21 is performed. In the present embodiment, the RAN controller 40 performs the allocation processing illustrated in FIG. 5 for both the uplink and the downlink.

Figure 6:
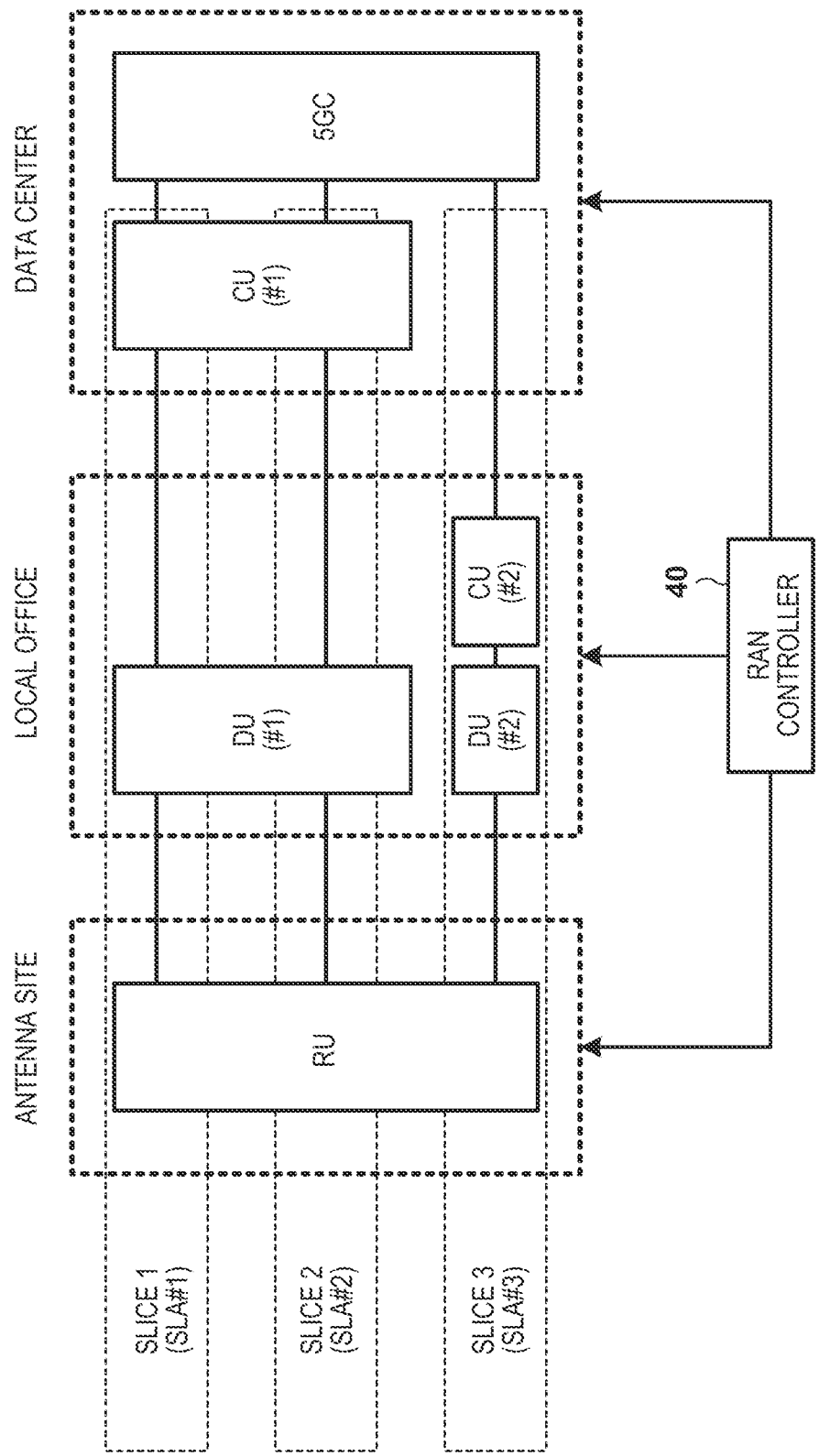
FIG. 6 is a diagram illustrating examples of the arrangement of CUs, DUs, and RUs in the base station system.

An example of the allocation processing will be described hereinafter assuming the arrangement example illustrated in FIG. 6 as the arrangement of the CUs 10, the DUs 20, and the RU 30. In the arrangement example illustrated in FIG. 6, the RU is placed at the antenna site, DU #1, which corresponds to slices 1 and 2, is placed at the local office, and CU #1, which corresponds to slices 1 and 2, is placed at the data center. In addition, PU #2 and CU #2, which correspond to slice 3, are placed at the local office. SLA #1, SLA #2, and SLA #3 are defined as Service Level Agreements (SLAs) for the slices 1 to 3, respectively.

First, in S51, the information obtainment unit 41 obtains an amount of data (the amount of communication data) and the communication quality of wireless communication using the UEs in the cell formed by the RU 30. The amount of communication data corresponds to, for example, the amount of data expected to be transmitted over the uplink or the downlink in the predetermined period T from the present time. The communication quality corresponds to the (instantaneous) radio communication quality at the present time, in the wireless communication by each UE, and is expressed, for example, as a signal-to-noise ratio (S/N).

The information obtainment unit 41 obtains the amount of data in the uplink, transmitted by each UE in a cell, through a notification made by each UE. Each UE notifies the scheduler 21 corresponding to the slice being used of the amount of data in the uplink. Accordingly, the information obtainment unit 41 can obtain a notification of the amount of data of the uplink of each UE via the scheduler 21. The amount of data in the downlink is also known on the base station side (the scheduler 21). Accordingly, the information obtainment unit 41 can obtain the amount of data in the downlink of each UE through a notification from the scheduler 21.

The information obtainment unit 41 obtains a measurement result of the communication quality by the RU 30 as the communication quality of the uplink for each UE in the cell, and obtains a measurement result of the communication quality by each UE as the communication quality of the downlink for each UE in the cell. The measurement result of the communication quality of the uplink can be obtained from the RU 30. The measurement result of the communication quality of the downlink can be obtained via the scheduler 21 by each UE making a report to the scheduler 21 corresponding to the slice used.

The amount of communication data and the communication quality of each UE obtained by the information obtainment unit 41 are stored in the information storage unit 44 as UE information. FIG. 7A illustrates an example of UE information for each DU (scheduler), including the amount of communication data and the communication quality for each UE. Note that as mentioned above, DU #1 is used for slice 1 (SLA #1) and slice 2 (SLA #2), and DU #2 is used for slice 3 (SLA #3). As illustrated in FIG. 7A, in the UE information, each UE is associated with the SLA of the slice used, as well as the amount of communication data and the communication quality (S/N) obtained by the information obtainment unit 41.

Next, in S52, the resource control unit 42 identifies the amount of radio resources required for each scheduler 21 (each DU) in the predetermined period T, on the basis of the amount of communication data and the communication quality of each UE in the cell, obtained in S51. Through this, each scheduler 21 can allocate an appropriate amount of radio resources according to the amount of radio resources expected to be needed in the predetermined period T, such that a situation where there are insufficient or excessive radio resources does not occur. The predetermined period T is defined as a period during which the amount of data and an amount of variation in radio quality of the wireless communication by the UEs in the cell formed by the RU 30 is less than or equal to a predetermined amount. This makes it possible to more accurately identify the amount of radio resources assumed to be required for each scheduler 21 (each DU) in the predetermined period T. Making the predetermined period T as long as possible within a range in which this amount of variation is less than or equal to the predetermined amount makes it possible to maintain the accuracy of the allocation of radio resources to each scheduler 21 while avoiding frequent updates to the allocation.

Specifically, the resource control unit 42 obtains the amount of radio resources required in the predetermined period T for each UE on the basis of the amount of communication data and the communication quality of each UE in the cell. For example, as the amount of communication data increases, the amount of radio resources required for each UE increases, whereas as the amount of communication data decreases, the amount of radio resources required for each UE decreases. Likewise, as the communication quality (S/N) decreases, the amount of radio resources required for each UE increases, whereas as the communication quality (S/N) increases, the amount of radio resources required for each UE decreases.

Furthermore, for each scheduler 21, the resource control unit 42 obtains a total amount of radio resources required for one or more UEs using the corresponding slice as the amount of radio resources required for that scheduler in the predetermined period T. In the example of FIG. 7A, the amount of radio resources required in the predetermined period T for DU #1 is 1,300 physical resource blocks (PRBs), which is obtained from the total amount of radio resources required for each UE in units of PRBs. Likewise, the amount of radio resources required in the predetermined period T for DU 42 is obtained as 1,100 PRBs. Note that if T=100 TTI, the amount of radio resources required per TTI is 13 PRB for DU #1 and 11 PRB for DU #2.

Next, in S53, the resource control unit 42 determines the margin that is to be allocated to each of the plurality of schedulers 21 (plurality of DUs) and that is the margin of radio resources that can be used for scheduling when radio resources are insufficient. This margin allocation enables each scheduler 21 to more appropriately secure the required radio resources. In S53, the remaining radio resources, which is an amount obtained by subtracting the amount of radio resources required for each scheduler 21 identified in S52 from the total amount of radio resources that can be allocated in the predetermined period T, are distributed as a margin to a plurality of schedulers through a predetermined method. More specific examples of the method for determining the margin will be described in the second and third embodiments.

Finally, in S54, the resource control unit 42 allocates, to each of the plurality of schedulers 21, the amount of radio resources identified in S52, together with the margin of radio resources that can be used for scheduling determined in S53. Then, the allocation notification unit 43 transmits, to each scheduler 21, a notification indicating the allocation of the radio resources and the margins according to the results of the allocation of the radio resources and the margins in S54. This ends the allocation processing performed through the sequence of FIG. 5.

Figure 8A:
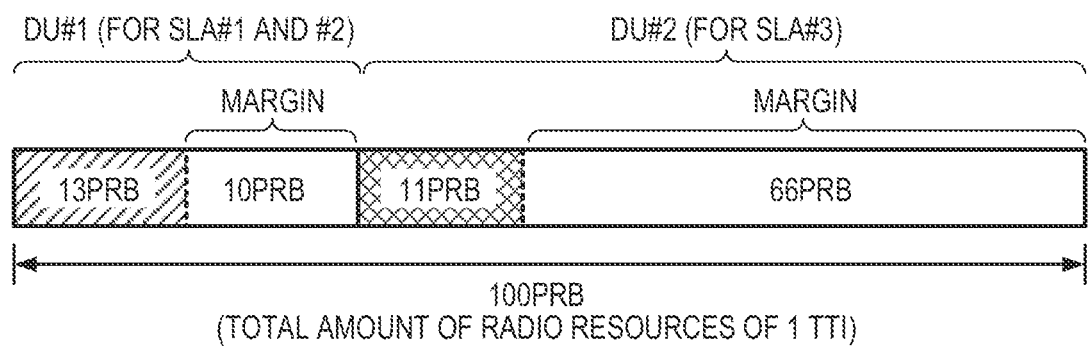
FIG. 8A is a diagram illustrating an example of the allocation of radio resources and margins to each of DUs (each of schedulers).

FIG. 8A is a diagram illustrating an example of the allocation of radio resources and margins to each DU (each scheduler 21). Note that FIG. 8A illustrates an example of the allocation of the radio resources and the margins in one TTI, for a case where the total amount of radio resources that can be allocated in one TTI is 100 PRB. In this example, 13 PRBs are allocated to DU #1 as radio resources and 10 PRBs as the margin. Additionally, 11 PRBs are allocated to DU #2 as radio resources and 66 PRBs as the margin. Although the radio resources that can be allocated are divided in the frequency direction for each TTI and allocated to each DU in this example, the radio resources may also be divided in the time direction. Division in the frequency direction is advantageous from the perspective of delay, while division in the time direction is advantageous in terms of reducing the complexity of the scheduler.

The radio resources allocated to each of the plurality of schedulers 21 by the resource control unit 42 are used by each scheduler for scheduling for a UE using the corresponding slice. The scheduling by each of the plurality of schedulers 21 is performed using radio resources within the range of the allocated radio resources plus the allocated margin.

As described above, in the base station system of the present embodiment, the plurality of schedulers 21, each corresponding to one or more slices, perform scheduling of radio resources for the UE that uses the corresponding slice in the same cell formed by one RU 30. For each of the plurality of schedulers 21, the RAN controller 40 identifies the amount of radio resources required for each scheduler in the predetermined period T on the basis of the amount of data and the communication quality of the wireless communication by the UEs in the cell. Furthermore, the RAN controller 40 allocates, to each of the plurality of schedulers 21, the identified amount of radio resources and the margin of radio resources that can be used for scheduling.

According to the present embodiment, the RAN controller 40 identifies the amount of radio resources required fix each scheduler (DU) in the predetermined period T and allocates the identified amount of radio resources. This makes it possible to allocate, to the plurality of schedulers 21, an amount of radio resources suited to the scheduling of radio resources within the predetermined period T. As a result, a situation in which any one of the schedulers has insufficient or excessive radio resources within the predetermined period T can be avoided. In addition to allocating radio resources, the RAN controller 40 also allocates, to the plurality of schedulers 21, the margin of radio resources that can be used for scheduling. This makes it possible for each scheduler to secure radio resources more appropriately, as well as avoid situations in which the service itself cannot be provided to the UE due to the inability to secure radio resources.

Second Embodiment

A second embodiment will describe a specific example of processing for distributing the remaining radio resources in the predetermined period T as a margin for each scheduler (each DU), as described in the first embodiment. Descriptions of parts identical to those in the first embodiment will be omitted in the following.

In the present embodiment, the resource control unit 42 allocates the remaining radio resources as a margin to the plurality of schedulers 21 on the basis of the slices used by each UE in the cell formed by the RU 30 and margin information determined in advance for each slice. Here, "remaining radio resources" refers to the amount of radio resources obtained by subtracting the amount of radio resources required for each scheduler 21 identified in S52 (FIG. 5) from the total amount of radio resources that can be allocated in the predetermined period T. In other words, the remaining radio resources correspond to surplus radio resources after the allocation of the amount of required radio resources identified in S52.

More specifically, the resource control unit 42 obtains the required margin for each of the plurality of schedulers 21 and distributes the remaining radio resources according to the required margin that has been obtained. The margin required for each scheduler (DU) can be obtained by finding the sum of the required margin for one or more UEs that use the corresponding slice in the cell.

The margin required for each UE is obtained as follows. For example, the margin information may be determined in advance and stored in the information storage unit 44 as information indicating the margin itself that is required when each slice is used by the UE. In this case, the resource control unit 42 obtains the required margin corresponding to the slice used by each UE in the cell as the required margin of the stated UE by referring to the margin information stored in the information storage unit 44.

The margin information may be a coefficient value used to calculate the margin required for each UE for the UE to use the corresponding slice, and may be information indicating the coefficient value to be multiplied by the required amount of radio resources for each UE in the predetermined period T. In this case, the resource control unit 42 obtains the coefficient value corresponding to the slice used by each UE in the cell by referring to the margin information stored in the information storage unit 44, and multiplies the coefficient value by the amount of radio resources required for the UE, which was obtained in S52. Through this, the required margin for the stated UE can be obtained from the amount of radio resources required for each UE.

FIG. 7B illustrates an example of such coefficient values (multipliers) associated with slices (SLAB) as an example of the margin information. The UE information illustrated in FIG. 7A includes the margin required for each UE, Which is obtained from the amount of radio resources required using the coefficient values illustrated in FIG. 7B. For example, the radio resources required for UE #5 using slice 3 (SLA #3) (700 PRBs) is multiplied by a coefficient of 0.5, corresponding to SLA #3, to obtain the required margin (350 PRBs). For UEs where the amount of communication data and radio resources required are zero, the required margin calculated using the coefficient values described above will be zero. However, the margin required can be given according to the communication quality (S/N) such that the margin required does not become zero for a UE for which the radio resources required are zero, such as UE #6 in the example in FIG. 7A.

The margin required for the UE may be determined by the following method instead of or in combination with the method described above. For example, the margin required fix a UE may be determined on the basis of a priority level established for the slice used by that UE. For example, a high priority level is set for a slice that provides a high-priority service, such as a mission-critical service, and a low priority level is set for a slice that provides a low-priority service, such as a best-effort service. Depending on the priority level, the margin required for the UE may be increased if the UE uses a slice having a higher priority level, and the margin required for the UE may be reduced if the UE uses a slice having a lower priority level.

Additionally, the margin required for a UE may be determined on the basis of an acceptable delay established for the slice used by that UE. For example, depending on this acceptable delay, the margin required for the UE may be reduced if the UE uses a slice that provides a service having a high acceptable delay, such as a download service. On the other hand, if the UE uses a slice that provides a service with a small acceptable delay, such as an online competitive game, the margin required margin for that UE may be increased.

In this manner, varying the margin required for the UE according to the service provided by the slice makes it possible to reduce the influence of a drop in the service quality caused by insufficient radio resources.

The margin required for the UE may also be determined on the basis of a priority level established for an operator providing the scheduler 21 that performs the scheduling for the UE. FIG. 9 illustrates an example of the configuration of a base station system in which a RU is shared by a plurality of operators (operators A and B), and a plurality of DUs provided by respectively different operators are connected to the RU. When such a configuration is employed, priority levels may be defined in advance for the DUs (schedulers) of each operator. In this case, according to the priority level defined for each operator, the margin required may be increased for UEs that are subject to scheduling by a DU (scheduler) provided by an operator with a higher priority level. Additionally, the margin required may be reduced for UEs that are subject to scheduling by a DU (scheduler) provided by an operator with a lower higher priority level.

After obtaining the margin required for each scheduler (DU) as described above, the resource control unit 42 distributes the remaining radio resources on the basis of a ratio of the margins required for the plurality of schedulers 21. According to the example in FIG. 7A, the remaining radio resources are distributed to DU #1 on the basis of the ratio of the margin required for DU #1 (26+20+100+17=163 [PRB]) to the margin required for DU #2 (350+500+200=1, 050 [PRB]). For example, as illustrated in the example in FIG. 8A, if the total amount of radio resources that can be allocated in one TTI is 100 PRBs, and 13 PRBs of radio resources are allocated to DU #1 and 11 PRBs to DU #2, the remaining radio resources are 76 PRBs. In this case, if the remaining radio resources (76 PRBs) are allocated on the basis of the stated ratio, a margin of 10 PRBs is determined for DU #1 and a margin of 66 PRBs for DU #2, as illustrated in FIG. 8A.

According to the present embodiment, an appropriate amount of margin can be determined as the margin of radio resources for the plurality of schedulers 21, such that a situation in which the service itself cannot be provided to the UE due to the inability to secure radio resources does not arise.

Third Embodiment

A third embodiment describes an example in which, when allocating (distributing) remaining radio resources to each scheduler as a margin in the predetermined period T, a margin that overlaps between schedulers is allocated. Descriptions of parts identical to those in the first and second embodiments will be omitted in the following.

In the present embodiment, in S53 (FIG. 5), the resource control unit 42 sets some of the remaining resources as an overlapping margin allocated so as to overlap among schedulers, such that the total amount of radio resources allocated to the plurality of schedulers 21 exceeds the remaining amount of radio resources. In this case, depending on the conditions of margin usage by each scheduler 21 (each DU), the usage by the plurality of schedulers may compete for the same radio resources, resulting in signal interference in the cell or a failure to allocate the radio resources. However, this does make it possible to reduce the likelihood of a situation in which one scheduler has insufficient radio resources but another scheduler has surplus radio resources (i.e., margin division loss).

<Overlapping Margin Determination>

Figure 8B:
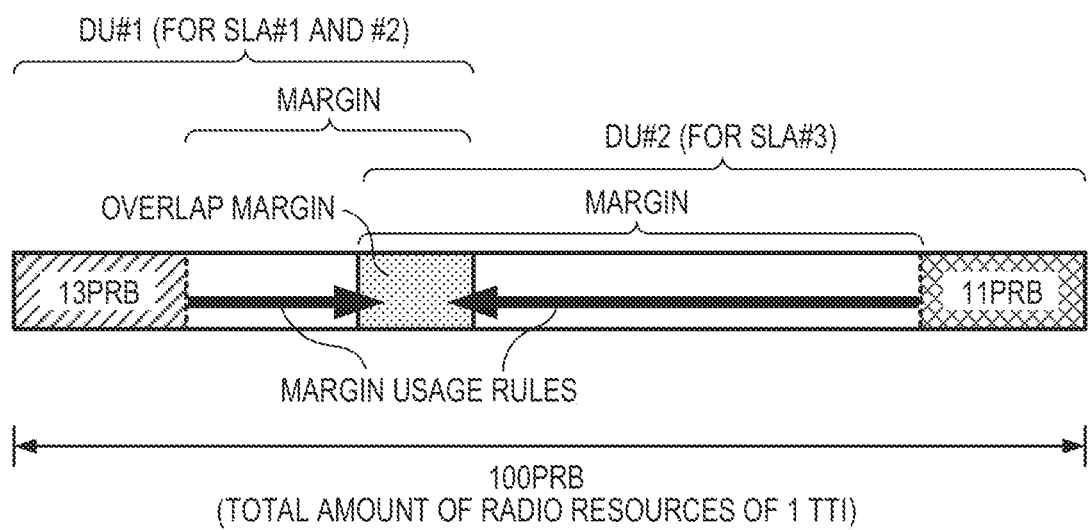
FIG. 8B is a diagram illustrating an example of the allocation of radio resources and margins to each of DUs (each of schedulers).

In the present embodiment, the information obtainment unit 41 accumulates, in the information storage unit 44, record information indicating a past record of overlapping scheduling among schedulers for the radio resources corresponding to the overlapping margin. The resource control unit 42 determines the overlapping margin according to the record information accumulated in the information storage unit 44. FIG. 8B illustrates an example in which some of the remaining radio resources are set as an overlapping margin between the scheduler of DU #1 and the scheduler of DU #2. Both the scheduler of DU #1 and the scheduler of DU #2 can use the radio resources of this overlapping margin for scheduling when the allocated radio resources alone are insufficient.

To achieve the setting of such an overlapping margin, the information obtainment unit 41 obtains the scheduling results from each of the plurality of schedulers 21, and accumulates the record information in the information storage unit 44 on the basis of the scheduling results by the plurality of schedulers.

The resource control unit 42 controls the amount of the overlapping margin allocated thereafter according to the amount of radio resources scheduled in an overlapping manner among the schedulers in the past, which is indicated by the record information accumulated in the information storage unit 44.

The resource control unit 42 may determine the overlapping margin among schedulers for each of combinations of schedulers among the plurality of schedulers 21. For example, if the plurality of schedulers includes first, second, and third schedulers (DU #1, DU #2, and DU #3), the resource control unit 42 may determine the overlapping margin such that the amount of the overlapping margin for the combination of the first and second schedulers (DU #1 and DU #2) is greater than the amount of the overlapping margin for the combination of the first and third schedulers (DU #1 and, DU #3).

In determining the overlapping margin in this manner, the amount of the overlapping margin for each combination of schedulers is controlled according to a priority level determined for the slice corresponding to each scheduler, used by the UEs in the cell formed by the RU 30.

<Setting Usage Rule for Overlapping Margin>

In the present embodiment, the rule setting unit 45 of the RAN controller 40 sets, for the RU 30, a rule for using the overlapping margin allocated by the resource control unit 42, for the overlapping margin determined as described above. The rule setting unit 45 sets a rule for ensuring that the radio resources allocated as the overlapping margin are not used simultaneously among schedulers. Through this, the likelihood that usage by the plurality of schedulers will compete for the same radio resources, resulting in signal interference in the cell or a failure to allocate the radio resources, is reduced.

FIG. 8B illustrates an example of such a usage rule for using the overlapping margin. In this example, a usage rule is set such that the schedulers of DU #1 and DU #2 first use the radio resources of margins aside from the overlapping margin, which have been respectively allocated thereto, and use the overlapping margin when the radio resources in the stated margins have been used up.

Additionally, the rule setting unit 45 may set the usage rule according to a priority level set for the slice corresponding to each scheduler, used by the UEs in the cell. Specifically, the rule setting unit 45 may set the usage rule such that the allocation of radio resources corresponding to the overlapping margin performed by a scheduler corresponding to a slice having a higher priority level is performed preferentially over the allocation of radio resources corresponding to the overlapping margin performed by a scheduler corresponding to a slice having a lower priority level.

In this case, the rule setting unit 45 notifies the RU 30 of the priority level set for the slice corresponding to each of the plurality of schedulers 21. If the radio resources corresponding to the overlapping margin have been scheduled in an overlapping manner among two or more schedulers, the RU 30 determines which of the two or more schedulers to prioritize for the radio resource allocation according to the priority level which has been notified.

As described thus far, allocating a margin that overlaps among schedulers to a plurality of schedulers makes it possible to reduce the likelihood of a situation in which one scheduler has insufficient radio resources but another scheduler has surplus radio resources.

Many variations can be made on the foregoing first to third embodiments. For example, the base station system can be configured such that of the processing of S51 to S54 in FIG. 5, the processing of S51 and, S52 is performed by each DU 20. Specifically, each DU 20 may identify the amount of radio resources required for the scheduler 21 of that DU on the basis of the amount of communication data and the communication quality of each UE, and notify the RAN controller 40 of a result of the identification. In this case, the RAN controller 40 can perform the processing of S53 and S54 in the same manner as in the foregoing embodiments upon receiving a notification from each DU 20.

Additionally, for example, the base station system can be configured such that at least some of the processing of S53 is performed by each DU 20 in addition to the processing of S51 and S52. Specifically each DU 20 may obtain the margin required for each UE and notify the RAN controller 40 of a result of the obtainment. In this case, upon receiving the notification from each DU 20, the RAN controller 40 can obtain the margin required for each scheduler (DU), determine the margin ultimately to be allocated to each DU, and perform the processing of S54 in the same manner as in the foregoing embodiments. Additionally, each DU 20 may obtain the margin required for each DU in addition to the margin required for each UE and notify the RAN controller 40 thereof. In this case, upon receiving the notification from each DU 20, the RAN controller 40 can determine the margin ultimately to be allocated to each DU and perform the processing of S54 in the same manner as in the foregoing embodiments.

Fourth Embodiment

Fourth to seventh embodiments of the present invention will be described further hereinafter.

In a base station system in which network slicing is applied as described above, it may be necessary to increase the fulfillment of the Service Level Agreement (SLA) of each slice (increase the quality of the service provided by each slice) when allocating radio resources, used for scheduling for each slice, to each slice (each scheduler). For example, a technique that distributes radio resources for scheduling to each slice so as to increase the SLA fulfillment of each slice when network slicing is applied is proposed in NPL 2, B. Khodapanah, A. Awada, I. Viering, D. Oehmann, Meryem Simsek, and G. P. Fettweis, "Fulfillment of Service Level Agreements via Slice-Aware Radio Resource Management in 5G Networks," 2018 IEEE 87th Vehicular Technology Conference (VTC Spring), pp. 1-6, June 2018.

However, with the foregoing conventional technique, radio resources for scheduling are not successfully distributed (allocated) to each slice so as to increase SLA fulfillment while ensuring isolation. For example, in NPL 2, a situation may arise in which excessive radio resources are allocated to slices in which there are wireless terminals having poor radio environments in an attempt to uniformly increase the SLA fulfillment of a plurality of slices, resulting in insufficient radio resources to be allocated to other slices. In this case, isolation among slices cannot be ensured.

When network slicing is applied in a base station system having functional division into DUs and CUs, the plurality of schedulers, each corresponding to at least one slice, may be placed at different locations (sites). However, the above-described conventional technique does not assume that the plurality of schedulers are placed at different locations, and can therefore not be applied in such a case.

Accordingly, the present embodiment provides a technique for a base station system in which network slicing is applied, which allocates radio resources to each of slices to improve the quality of the service provided by each slice while ensuring isolation among the slices. In the following, the configuration and operations of the base station system, and control of the base station system, according to the present embodiment will be described in detail. In the present embodiment, the base station system has the same configuration as the configuration of the base station system of the first to third embodiments (FIGS. 1 and 2).

<Device Configuration>

In the present embodiment, the RAN controller 40 has the hardware configuration illustrated in FIG. 3 as an example, as in the first to third embodiments. In the present embodiment, the RAN controller 40 functions as an example of a control apparatus that allocates radio resources, which are used in scheduling for each of a plurality of slices, to each of the slices.

Note that as in the first to third embodiments, the RAN controller 40 may include dedicated hardware for executing the various functions described later, or some functions may be executed by hardware, with the rest executed by a computer running programs. Alternatively, all functions may be executed using a computer and programs.

The CUs 10, the DUs 20, and the RU 30 may also have hardware configurations such as those illustrated in FIG. 3. However, as the communication device 105, the RU 30 includes a wireless communication interface for wireless communication with wireless terminals in addition to the communication interface for communication with each of the DUs 20.

Figure 10:
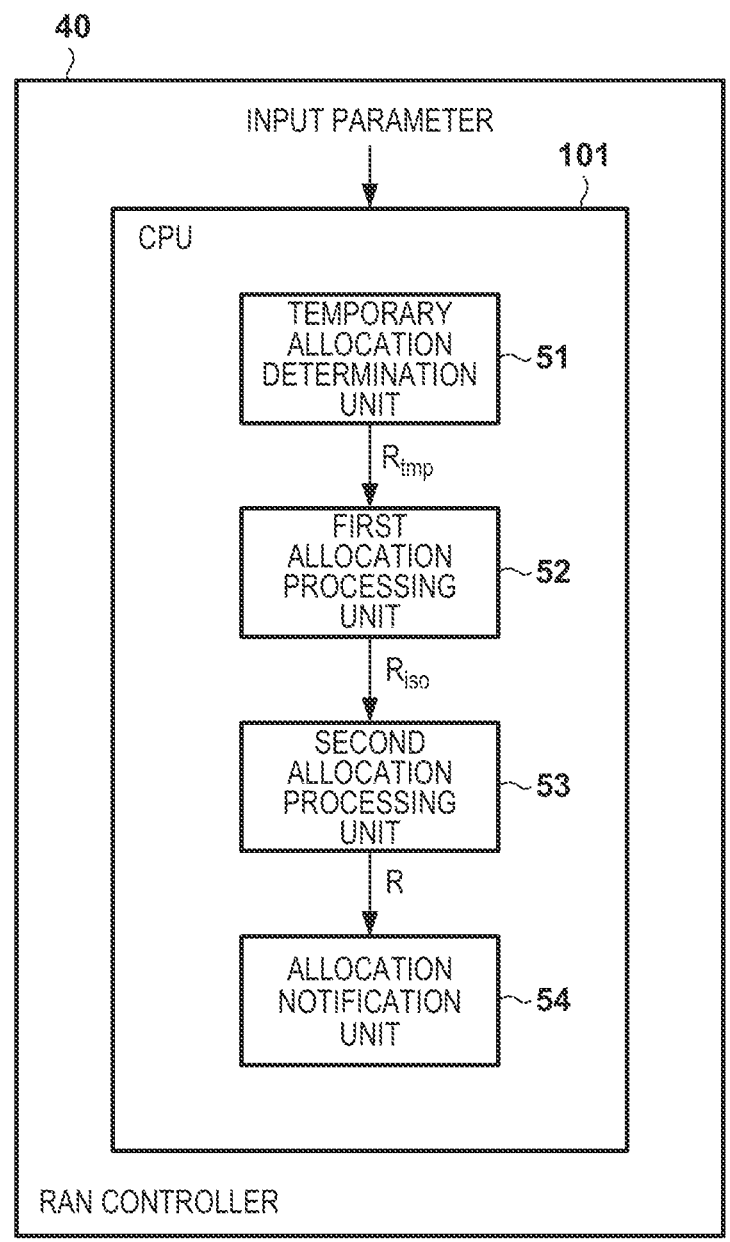
FIG. 10 is a block diagram illustrating an example of the functional configuration of a RAN controller.

FIG. 10 is a block diagram illustrating an example of the functional configuration of the RAN controller 40 of the present embodiment. The RAN controller 40 of the present embodiment includes a temporary allocation determination unit 51, a first allocation processing unit 52, a second allocation processing unit 53, and an allocation notification unit 54. In the present embodiment, these functional units are realized by the CPU 101, as a result of the CPU 101 executing control programs, but dedicated hardware may be provided to realize each functional unit. Note that in FIG. 10, of the functions of the RAN controller 40, only the functional units related to the allocation of radio resources to each scheduler 21 (the allocation of radio resources to each of a plurality of slices, used in scheduling for each of the slices) are illustrated, and functional units related to other functions are not shown.

The temporary allocation determination unit 51 temporarily allocates radio resources to each of the plurality of slices to achieve isolation among the slices for the radio resources used in scheduling for each slice. Specifically, the temporary allocation determination unit 51 determines a temporary allocation (temporary allocation amount) $R_{tmp}$ of radio resources for each of the plurality of slices according to a distribution ratio determined in advance. The temporary allocation determination unit 51 outputs the determined temporary allocation $R_{tmp}$ to the first allocation processing unit 52.

The first allocation processing unit 52 performs first allocation processing for allocating radio resource to the plurality of slices, using the temporary allocation $R_{tmp}$ as an upper limit. The first allocation processing unit 52 outputs, to the second allocation processing unit 53, an allocation $R_{iso}$ of the radio resources determined for the plurality of slices.

The second allocation processing unit 53 performs second allocation processing in which of all the radio resources that can be used in the allocation by the first allocation processing unit 52, surplus radio resources that were not allocated by the first allocation processing unit 52 are distributed (redistributed) to one or more slices. The second allocation processing unit 53 outputs an allocation R of the radio resources determined for the plurality of slices as a final allocation.

The allocation notification unit 54 transmits a notification indicating the allocation of the radio resources that can be used for scheduling for the scheduler 21 corresponding to each slice (21a, 21b, and 21c) on the basis of the allocation R determined by the second allocation processing unit 53. This completes the allocation of radio resources to the plurality of slices.

<Timing of Allocation of Radio Resources to Each Slice>

Figure 11:
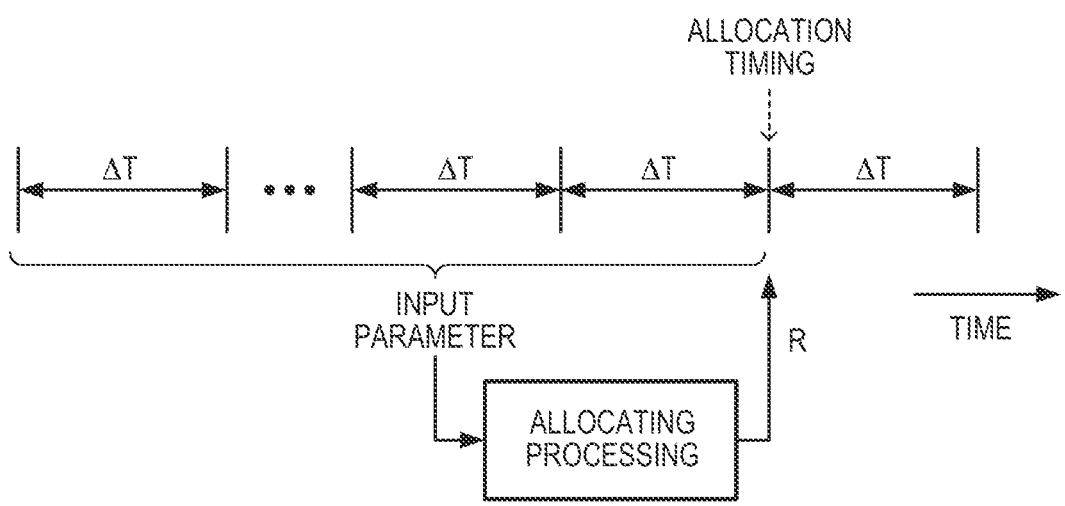
FIG. 11 is a diagram illustrating an example of the timing of allocation of radio resources to a plurality of slices.

In the present embodiment, the RAN controller 40 allocates (distributes) radio resources to each scheduler 21 (each slice) at predetermined time intervals. FIG. 11 is a diagram illustrating an example of the timing of the allocation of radio resources to each scheduler.

Here, in base station system architecture such as that of the present embodiment, schedulers can be placed at different locations (sites). In the configuration example in FIG. 2, the scheduler 21c is placed in a location different from the schedulers 21a and 21b. When a plurality of schedulers corresponding to different slices are placed at different locations, it is difficult to update the allocation of radio resources to each scheduler (each slice) at each transmission time interval (TTI), which is generally the minimum unit of time for scheduling.

For this reason, as illustrated in FIG. 11, the RAN controller 40 allocates (updates the allocation of) radio resources to each scheduler every time interval $\Delta T$ longer than the TTI (e.g., 100 TTIs). At this time, the RAN controller 40 allocates (distributes) radio resources to the plurality of slices in the next predetermined period (time interval $\Delta T$) on the basis of input parameters obtained in the one or more of the predetermined periods (time intervals $\Delta T$) in the past. Note that a target value for throughput (a target throughput) determined by the Service Level Agreement (SLA) of each slice, and a Signal-to-Interference Noise Ratio (SINR) for each wireless terminal using each slice, are examples of the input parameters. An average traffic demand in each slice is also an example of an input parameter.

<First Allocation Processing>

As described above, in the scheduling of radio resources when network slicing is applied, it is necessary to achieve isolation among slices such that difference slices from influencing each other. Specifically, it is necessary for the schedulers 21a, 21b, and 21c to perform scheduling for the wireless terminal using the corresponding slice by using mutually-different radio resources. The RAN controller 40 of the present embodiment allocates the radio resources to each scheduler 21 (each slice) to ensure such isolation by using the temporary allocation determination unit 51 and the first allocation processing unit 52. In the following, the number of slices set by the RAN controller 40 for the plurality of CUs 10 and the plurality of DUs 20 is represented by L.

The temporary allocation determination unit 51 determines the temporary allocation amount $R_{tmp}$ of radio resources for each of the plurality of (L) slices according to the distribution ratio determined in advance. $R_{tmp}$ is expressed as follows.

$$R_{tmp} = [\, r_{tmp,1} \quad r_{tmp,2} \quad \cdots \quad r_{tmp,L} \,]$$

$r_{tmp,s}$ represents the distribution ratio of radio resources to a slice s (s=1, 2, . . . , L) based on the total amount of radio resources that can be used for allocation by the first allocation processing unit 52. The distribution ratio for each slice is determined in advance as, for example, the ratio of a target throughput (a target value for a predicted throughput, which will be described later) $T_{tgt,s}$ determined by the SLA to each of the plurality of slices. In this case, as the target throughput determined for the slice increases, a greater distribution ratio is determined for that slice, whereas as the target throughput decreases, a smaller distribution ratio is determined for that slice.

In the present embodiment, the temporary allocation determination unit 51 determines the temporary allocation amount $R_{tmp}$ for each slice such that the total amount of radio resources that can be used for the allocation by the first allocation processing unit 52 is distributed among the slices according to the distribution ratio determined in advance.

The first allocation processing unit 52 determines the allocation $R_{iso}$ of radio resources by allocating radio resources to each of the plurality of (L) slices using the temporary allocation $R_{tmp}$ as an upper limit. $R_{iso}$ is expressed as follows.

$$R_{iso} = [\, r_{iso,1} \quad r_{iso,2} \quad \cdots \quad r_{iso,L} \,]$$

$r_{iso,s}$ represents the distribution ratio of radio resources in the first allocation processing to a slice s (s=1, 2, . . . , L) based on the total amount of radio resources that can be used for allocation by the first allocation processing unit 52.

Specifically, the first allocation processing unit 52 obtains a predicted communication capacity (predicted throughput) for each slice while gradually increasing the amount of radio resources $r_{iso,s}$ allocated to that slice from 0. The predicted throughput is obtained for each slice on the basis of the amount of radio resources allocated to that slice and the communication quality for that slice. A predicted throughput $T_s$ for the slice s (s=1, 2, . . . , L) is obtained as follows.

First, of the users using the slice s, a distribution $r^i_{iso,s}$ of radio resources to a user i is expressed through the following formula using round robin.

$$r^i_{iso,s}(R_{iso}) = \frac{r_{iso,s}}{N_s}$$

Here, $N_s$ represents the number of users in the slice s. The predicted throughput $T_s$ is obtained through the following formula on the basis of Shannon's theorem.

$$T_s(R_{iso}) = \sum_{i=1}^{N_s} r^i_{iso,s} \cdot n \cdot B \cdot \log_2(1 + \gamma^i_s)$$

Here, n represents the total number of physical resource blocks (PRBs) that can be used for the allocation by the first allocation processing unit 52, B represents the frequency bandwidth per PRB (unit radio resource) [Hz], and $\gamma^i_s$ represents the SINR for the user i in the slice s. Because Shannon's theorem used in the above formula is for finding a communication channel limit, the bitrate per unit frequency is actually found using the table shown in FIG. 12.

In this manner, the first allocation processing unit 52 of the present embodiment obtains, as the communication quality for the slice s, the predicted throughput $T_s$ using the SINR $\gamma^i_s$ for each wireless terminal using that slice.

The first allocation processing unit 52 increases the amount of radio resources $r_{iso,s}$ allocated to each slice s (s=1, 2, . . . , L) from 0, and determines whether or not the predicted throughput $T_s$ obtained as described above satisfies the target value (target throughput $T_{tgt,s}$) determined for that slice ($T_s \geq T_{tgt,s}$).

When the predicted throughput $T_s$ reaches the target throughput $T_{tgt,s}$ while the amount of radio resources allocated to the slice s is being increased, the first allocation processing unit 52 stops allocating radio resources to that slice. Additionally if the amount of radio resources $r_{iso,s}$ allocated to the slice s reaches the temporary allocation amount $r_{tmp,s}$, which is the upper limit, without the predicted throughput $T_s$ reaching the target throughput $T_{tgt,s}$, the first allocation processing unit 52 stops allocating radio resources to that slice.

Figure 13A:
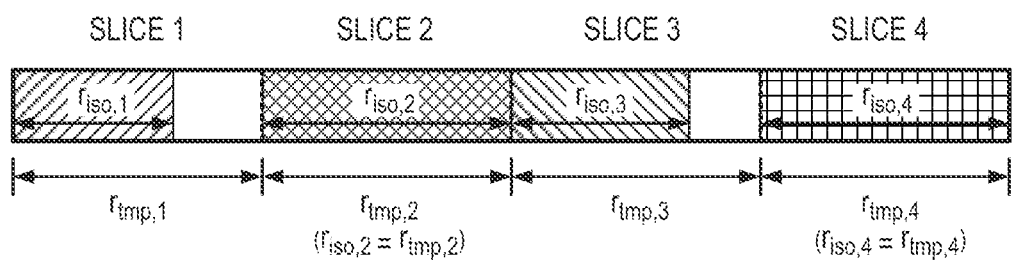
FIG. 13A is a diagram illustrating an example of a result of allocating radio resources through first allocation processing.

FIG. 13A is a diagram illustrating an example of a result of allocating radio resources by the first allocation processing unit 52. Note that a case where the number of slices L=4 is illustrated here. In the example of FIG. 13A, for slices 1 and 3, the predicted throughput $T_s$ reaches the target throughput $T_{tgt,s}$ (i.e., the SLA is fulfilled) before the radio resources $r_{iso,s}$ allocated to each slice reaches the upper limit. In this case, the radio resources are not allocated up to the temporary allocation amount $r_{tmp,s}$, which is the upper limit, and thus surplus radio resources ($r_{tmp,s} - r_{iso,s}$) arise. By using these surplus radio resources in the second allocation processing by the second allocation processing unit 53, resources can be distributed (redistributed) to other slices to improve the fulfillment of SLAs for the other slices.

On the other hand, in the example of FIG. 13A, for slices 2 and 4, the radio resources $r_{iso,s}$ allocated to each slice reach the temporary allocation amount $r_{tmp,s}$, which is the upper limit (i.e., $r_{iso,s} = r_{tmp,s}$), without the predicted throughput $T_s$ reaching the target throughput $T_{tgt,s}$. In this case, the surplus radio resources for the slices 1 and 3 are further allocated to the slices 2 and 4, which reached the upper limit of allocation without the target throughput being met, through the second allocation processing by the second allocation processing unit 53.

In this manner, for each slice, the first allocation processing unit 52 allocates radio resources to the slice, using the temporary allocation amount $r_{tmp,s}$ as an upper limit, until the predicted communication capacity (predicted throughput $T_s$) obtained on the basis of the amount of radio resources allocated to the slice and the communication quality (SINR) for that slice meets the target value (the target throughput $T_{tgt,s}$) determined for that slice. Through this, the first allocation processing unit 52 determines the allocation $R_{iso}$ of radio resources based on the temporary allocation $R_{tmp}$, and outputs the allocation $R_{iso}$ to the second allocation processing unit 53.

<Second Allocation Processing>

The second allocation processing unit 53 performs second allocation processing in which of all the radio resources that can be used in the allocation by the first allocation processing unit 52, surplus radio resources that were not allocated by the first allocation processing unit 52 are distributed (redistributed) to one or more slices for which radio resources are insufficient for fulfilling the SLA.

Figure 13B:
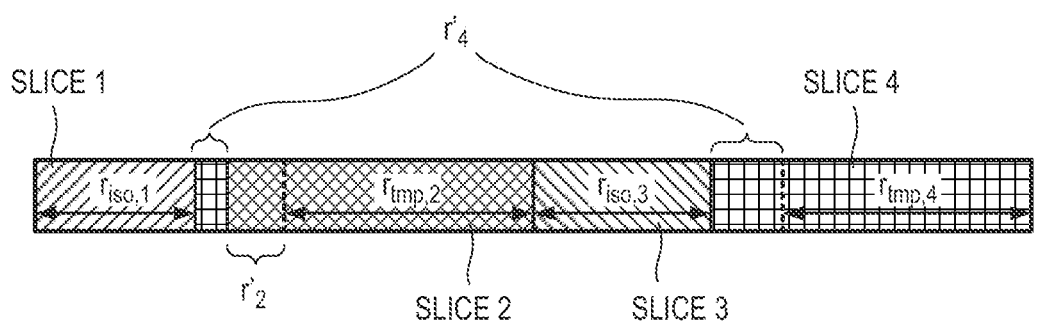
FIG. 13B is a diagram illustrating an example of a result of allocating radio resources through second allocation processing.

In the present embodiment, the second allocation processing unit 53 distributes surplus radio resources, which were not allocated to slices for which the target value is met (slices 1 and 3, in the example in FIGS. 13A and 13B), to one or more slices, among the plurality of (L) slices, for which the amount of radio resources allocated by the first allocation processing unit 52 without the target value (the target throughput $T_{tgt,s}$) being met reaches the temporary allocation amount $r_{tmp,s}$, which is the upper limit (slices 2 and 4, in the example in FIGS. 13A and 13B).

Specifically, first, the second allocation processing unit 53 adds the radio resources which were not allocated by the first allocation processing unit 52 to a resource pool P, as in the following formula.

$$P = \sum_{s=1}^{L} (r_{tmp,s} - r_{iso,s})$$

Note in the first allocation processing by the first allocation processing unit 52, $r_{iso,s} = r_{tmp,s}$ for slices for which the radio resources $r_{iso,s}$ allocated to each slice has reached the temporary allocation amount $r_{tmp,s}$ (slices 1 and 3, in the example in FIGS. 13A and 13B), and thus the amount of radio resources added to the resource pool P is 0.

Here, a radio resource distribution ratio R' for each of the plurality of (L) slices for redistributing the radio resources contained in the resource pool P is defined by the following formula.

$$R' = [\, r'_1 \quad r'_2 \quad \ldots \quad r'_L\,]$$

$r'_s$ represents the distribution ratio of radio resources in the second allocation processing to a slice s (s=1, 2, . . . , L) based on the total amount of radio resources that can be used for allocation by the first allocation processing unit 52.

For one or more slices for which the target throughput $T_{tgt,s}$ was not met in the first allocation processing, the second allocation processing unit 53 allocates surplus radio resources (the radio resources contained in the resource pool P) to the one or more slices such that the fulfillment of the predicted throughput with respect to the target throughput $T_{tgt,s}$ (i.e., the SLA fulfillment) is maximized.

Specifically, the second allocation processing unit 53 finds an R' that minimizes an evaluation function Φ(R') by solving the optimization problem, as shown in the following formula.

$$\min_{R'} \Phi(R')$$

However, the following conditions are assumed to apply.

$$\sum_{s=1}^{L} r'_s \leq P$$

The evaluation function Φ(R') described above is defined by the following formula, using a cost function $\Phi_s(R')$ corresponding to the slice s (s=1, 2, . . . , L).

$$\Phi(R') = \sum_{s=1}^{L} w_s \Phi_s(R')$$

Here, $w_s$ represents a weight applied to the slice s (s=1, 2, . . . , L), and $\Phi_s(R')$ represents the cost function corresponding to each slice, defined by the following formula.

$$\Phi_s(R') = \left(1 - \frac{A_s(R')}{T_{tgt,s}}\right)^2$$

The closer the ratio of a predicted throughput $A_s(R')$ to the target throughput $T_{tgt,s}$ for the corresponding slice s is to a predetermined value (e.g., 1), the smaller the output value of the cost function becomes.

The weight $w_s$ applied to the cost function $\Phi_s(R')$ corresponding to each slice in the above-described evaluation function Φ(R') is determined, for example, according to the target throughput $T_{tgt,s}$ determined for the SLA. The evaluation functions Φ(R') is defined as the sum of cost functions $\Phi_s(R')$ weighted according to the weight Weighting the cost function $\Phi_s(R')$ according to such a weight w, makes it possible to ensure fairness among slices from the perspective of SLA fulfillment in the allocation of radio resources through the second allocation processing.

The predicted throughput of the slice s, which defines the cost function $\Phi_s(R')$ included in the above-described evaluation function Φ(R'), is obtained through the following formula.

$$A_s(R') = \sum_{i=1}^{N_s} r^j_{iso,s} \frac{r_s}{N_s} \cdot n \cdot B \cdot \log_2(1 + \gamma^j_s)$$

Like the predicted throughput $T_s$ obtained in the first allocation processing, this predicted throughput $A_s(R')$ is obtained using a table such as that shown in FIG. 12. $r_s$ in the above formula represents the final resource allocation for the slice s, as indicated by the following formula.

$$r_s = \begin{cases} r_{tmp,s} + r'_s & (T_s < T_{tgt,s}) \\ r_{iso,s} & (T_s \geq T_{tgt,s}) \end{cases}$$

Here, at the completion stage of the first allocation processing, if the target throughput $T_{tgt,s}$ defined by the SLA is fulfilled for the slice s ($T_s \geq T_{tgt,s}$), i.e., the SLA is fulfilled, the amount of radio resources $r_s$ ultimately allocated to the slice s will be the amount $r_{iso,s}$ allocated in the first allocation processing ($r_s = r_{iso,s}$). On the other hand, at the completion stage of the first allocation processing, if the target throughput $T_{tgt,s}$ defined by the SLA is not fulfilled for the slice s ($T_s < T_{tgt,s}$), i.e., the SLA is not fulfilled, $r_s$ will be an amount obtained by adding the amount $r'_s$ allocated in the second allocation processing to the amount $r_{tmp,s}$ allocated in the first allocation processing ($r_s = r_{tmp,s} + r'_s$).

The second allocation processing unit 53 redistributes the radio resources contained in the resource pool P to one or more slices for which the target throughput $T_{tgt,s}$ was not met in the first allocation processing so as to minimize the output value of the evaluation function $\Phi(R')$ described above. In other words, the second allocation processing unit 53 determines R' so as to minimize the output value of the evaluation function $\Phi(R')$. Through this, the final resource allocation $r_s$ is determined for each slice s (s=1, 2, ..., L).

The second allocation processing unit 53 determines the allocation R of the radio resources for the plurality of (L) slices, expressed by the following formula, as the final allocation, and outputs the allocation R to the allocation notification unit 54.

$$R = [r_1 \; r_2 \; \ldots \; r_L]$$

FIG. 13B is a diagram illustrating an example of a result of allocating radio resources by the second allocation processing unit 53. In the example in FIG. 13B, the surplus radio resources for the slices 1 and 3, indicated in FIG. 13A, are redistributed to the slices 2 and 4 through the above-described second allocation processing. In other words, the surplus radio resources for the slices 1 and 3, for which the SLA is fulfilled through the first allocation processing, are redistributed to the remaining slices 2 and 4 so as to improve the fulfillment of the SLA for the slices 2 and 4.

As described above, the RAN controller 40 of the present embodiment determines the temporary allocation amount of radio resource for each of the plurality of slices according to the distribution ratio determined in advance. Then, for each slice, the RAN controller 40 allocates the radio resources using the temporary allocation amount as an upper limit, until the predicted communication capacity obtained for the slice meets the target value determined for the slice. Furthermore, the RAN controller 40 allocates, to one or more slices for which the target value is not met and the amount of radio resources allocated has reached the upper limit, the surplus radio resources that were not allocated to the slices for which the target value was met.

According to the present embodiment, in the first allocation processing, the RAN controller 40 allocates radio resources to each slice using the temporary allocation amount determined for each slice as an upper limit. Through this, when increasing the radio resources allocated to each slice, in the range of the temporary allocation amount, radio resources are allocated independently among slices until the SLA is fulfilled (until the target throughput $T_s$ is met). The RAN controller 40 stops allocating radio resources to slices for which the SLA is fulfilled, and further allocates the surplus radio resources to slices for which the SLA is not fulfilled, through the second allocation processing. In this manner, it is possible to distribute radio resources to each slice so as to increase the quality of the service provided by each slice (i.e., increase the SLA fulfillment) through the second allocation processing while ensuring isolation among slices.

Fifth Embodiment

A fifth embodiment will describe an example of allocating (redistributing) surplus radio resources on the basis of priority levels set in advance for a plurality of slices as the second allocation processing by the second allocation processing unit 53. The following will describe areas that are different from the fourth embodiment.

In the present embodiment, the second allocation processing by the second allocation processing unit 53 differs from that of the fourth embodiment. The second allocation processing unit 53 allocates radio resources from the surplus radio resources to each slice in order from the slice having the highest of priority levels set in advance, of the one or more slices for which the target throughput (the target value for the predicted communication capacity) was not met in the first allocation processing. At this time, the second allocation processing unit 53 obtains the predicted throughput $A_s(R')$ of each slice (slice s), and allocates radio resources from the surplus radio resources (the resource pool P) until the predicted throughput meets the target throughput $T_{tgt,s}$.

More specifically, the second allocation processing unit 53 allocates radio resources from the surplus radio resources to each target slice until there are no more surplus radio resources, in order from the target slice having the highest priority level. For example, in the example of FIG. 13A, the second allocation processing is performed for slices 2 and 4, in the same manner as in the fourth embodiment. Here, when slice 2 has a higher pre-set priority level than slice 4, the surplus radio resources are allocated to slice 4 after the surplus radio resources have been allocated to slice 2. This allocation (redistribution) of radio resources is performed until there are no more surplus radio resources.

In this manner, according to the second allocation processing based on the priority level, in addition to the effects of the fourth embodiment, radio resources can be distributed to each slice while increasing the likelihood that slices having high priority levels will fulfill the SLAs.

The priority level set in advance for each slice, described above, can be set in a variety of ways, as will be described below.

Priority Level Setting Based on SINR (Communication Quality)

The second allocation processing unit 53 can set the priority level for the plurality of slices such that the priority level increases as the communication quality for each of the plurality of slices increases. In this case, for example, an average SINR in the immediately-previous predetermined period (time interval $\Delta T$) (i.e., an average value of the SINR for all PRBs of all users in the target slice) is used as the communication quality for setting the priority level. Performing the second allocation processing on the basis of such a priority level setting makes it possible to increase the frequency utilization efficiency.

Priority Level Setting Based on Acceptable Delay

The second allocation processing unit 53 can set the priority level for the plurality of slices such that the priority level increases as the acceptable delay for each of the plurality of slices decreases. Performing the second allocation processing on the basis of such a priority level setting makes it possible to, for example, shorten the queue required for slices having a low acceptable delay, such as slices corresponding to URLLC.

Priority Level Setting through Proportional Fairness (PF) Method

The second allocation processing unit 53 can set the priority levels for the plurality of slices using the PF method. In this case, the second allocation processing unit 53 sets the priority level for the plurality of slices such as the ratio of the predicted throughput per unit of radio resources (1 PRB) in the immediately-previous predetermined period ($\Delta T$) to an average value of the predicted throughput (predicted communication capacity) per unit of radio resources (1 PRB) in a past plurality of predetermined periods ($\Delta T$) increases for each of the plurality of slices, the priority level increases.

Performing the second allocation processing on the basis of such a priority level setting makes it possible to allocate surplus radio resources in the second allocation processing while taking into consideration the communication quality and fairness among slices. As a result, an opportunity to allocate surplus radio resources can be given to slices in which wireless terminals having low SINR are present as well.

Priority Level Setting Based on SLA Achievement Rate

The second allocation processing unit 53 can set the priority levels for the plurality of slices such that as the ratio of the predicted throughput upon the first allocation processing unit 52 finishing the allocation to the target throughput (the predicted communication capacity target value) (i.e., an SLA achievement level) increases, the priority level increases. Performing the second allocation processing on the basis of such a priority level setting makes it possible to increase the fairness among slices with respect to the allocation of surplus radio resources, from the perspective of the SLA achievement level.

Sixth Embodiment

A sixth embodiment will describe an example of allocating (redistributing) surplus radio resources according to a weight determined for each of a plurality of slices as the second allocation processing by the second allocation processing unit 53. The following will describe areas that are different from the fourth and fifth embodiments.

In the present embodiment, the second allocation processing by the second allocation processing unit 53 differs from those of the fourth and fifth embodiments. The second allocation processing unit 53 sets weights for a plurality of slices in advance as parameters, and distributes the radio resources from the surplus radio resources (the resource pool) in the second allocation processing according to a ratio of the weights of the slices. Specifically, according to a weight determined for each of one or more slices for which the target throughput (predicted communication capacity target value) was not met in the first allocation processing, the second allocation processing unit 53 distributes the surplus radio resources to the stated one or more slices.

In this manner, according to the second allocation processing based on weights, surplus radio resources can, according to the weights, be fully distributed to one or more slices for which the target throughput was not met in the first allocation processing. Through this, unlike in the fifth embodiment, a situation in which the surplus radio resources are not allocated to slices with a low priority level when the radio resources in the resource pool P are exhausted due to being allocated to slices with high priority can be avoided.

The weight set in advance for each slice, described above, can be set in a variety of ways, as will be described below.

Weight Setting Based on PF Method

The second allocation processing unit 53 can set the weights for the plurality of slices using the PF method. In this case, for each of the plurality of slices, the second allocation processing unit 53 sets a ratio of the predicted throughput (the predicted communication capacity) per unit of radio resources (1 PRB) in the immediately-previous predetermined period ($\Delta T$) to an average value of the predicted throughput per unit of radio resources in a past plurality of predetermined periods ($\Delta T$) as the weight for that slice.

Performing the second allocation processing on the basis of such a weight setting makes it possible to allocate (distribute) surplus radio resources in the second allocation processing while taking into consideration the communication quality and fairness among slices. As a result, an opportunity to allocate surplus radio resources can be given to slices in which wireless terminals having low SINR are present as well.

Weight Setting Based on SLA Achievement Rate

The second allocation processing unit 53 sets, for each of the plurality of slices, an inverse of a ratio of the predicted throughput upon the first allocation processing unit 52 finishing the allocation to the target throughput (the predicted communication capacity target value) (i.e., an SLA achievement level), as the weight for that slice.

Performing the second allocation processing on the basis of such a weight setting makes it possible to increase the fairness among slices with respect to the allocation of surplus radio resources, from the perspective of the SLA achievement level.

Seventh Embodiment

A seventh embodiment will describe an example in which the temporary allocation performed in the first allocation processing and the allocation of radio resources based on the temporary allocation is repeated until the surplus radio resources are exhausted, as the second allocation processing performed by the second allocation processing unit 53. The following will describe areas that are different from the fourth to sixth embodiments.

In the present embodiment, the second allocation processing unit 53 repeatedly allocates, on the basis of the temporary allocation $R_{tmp}$ determined by the temporary allocation determination unit 51, the radio resources in the resource pool P to one or more slices for which the target throughput was not met in the first allocation processing.

Specifically, first, the second allocation processing unit 53 temporarily allocates, to each of the one or more slices, surplus radio resources (the resource pool P) according to the distribution ratio ($R_{tmp}$) determined in advance. Furthermore, the second allocation processing unit 53 further allocates radio resources to each slice, using the amount of radio resources which were temporarily allocated as an upper limit, until the predicted throughput meets the target throughput for that slice. Once the allocation using the temporary allocation amount as an upper limit in the same manner as the first allocation processing is complete, the second allocation processing unit 53 reconfigures the resource pool P with the surplus resources at that point in time. The second allocation processing unit 53 repeats the above-described temporary allocation and the allocation of the radio resources in the resource pool P until the surplus radio resources are exhausted.

According to the present embodiment, repeatedly distributing the radio resources in the resource pool P on the basis of the temporary allocation $R_{tmp}$ until the surplus radio resources are exhausted makes it possible to increase the fairness of the distribution of radio resources among the slices.

Note that the control apparatus according to the foregoing first to seventh embodiments can be realized by a computer program for causing a computer to function as the control apparatus. The computer program may be stored in a computer-readable storage medium and distributed in such a state, or may be distributed over a network.

The invention is not limited to the foregoing embodiments, and various variations/changes are possible within the spirit of the invention.

What is claimed is:

1. A control apparatus that controls radio resources used by a scheduler performing scheduling for allocating radio resources to a wireless terminal, the control apparatus comprising:
   at least one processor circuit with a memory comprising instructions, that when executed by the at least one processor circuit, cause the at least one processor circuit to perform:
   identifying, for each of a plurality of schedulers that are included in respective distribution units (DUs), an amount of radio resources required for each scheduler in a predetermined period, on the basis of an amount of data and a communication quality of wireless communication by the wireless terminal in a same cell formed by one radio unit (RU), wherein each of the plurality of schedulers corresponds to one or more slices and is connected with the one RU, and is configured to perform, in the same cell formed by the one RU, scheduling of radio resources for a wireless terminal that uses a corresponding slice; and
   allocating, to each of the plurality of schedulers, the identified amount of radio resources and a margin of radio resources that can be used for the scheduling.

2. The control apparatus according to claim 1, wherein the identifying includes:
   obtaining, for each wireless terminal, the amount of radio resources required in the predetermined period on the basis of the amount of data and the communication quality of wireless communication by each wireless terminal in the cell; and
   obtaining, for each scheduler, a total amount of radio resources required for one or more wireless terminals that use a corresponding slice as the amount of radio resources required for the scheduler in the predetermined period.

3. The control apparatus according to claim 1, wherein the radio resources allocated to each of the plurality of schedulers are used by each scheduler for the scheduling for a wireless terminal that uses the corresponding slice.

4. The control apparatus according to claim 1, wherein the scheduling by each of the plurality of schedulers is performed using radio resources within a range of the allocated radio resources plus the allocated margin.

5. The control apparatus according to claim 1, wherein when executed by the at least one processor circuit, the instructions further causes the at least one processor circuit to perform:
   determining the margin to be allocated by the allocation unit to each of the plurality of schedulers,
   wherein the determining includes distributing remaining radio resources to the plurality of schedulers as the margin, the remaining radio resources being an amount obtained by subtracting the identified amount of radio resources as being required for each scheduler, from a total amount of radio resources that can be allocated in the predetermined period.

6. The control apparatus according to claim 5, wherein the determining includes distributing the remaining radio resources on the basis of the slice used by each wireless terminal in the cell and margin information determined in advance for each slice.

7. The control apparatus according to claim 5, wherein the determining includes obtaining a required margin for each of the plurality of schedulers on the basis of the slice used by each wireless terminal in the cell and margin information determined in advance for each slice, and distributing the remaining radio resources according to required margins obtained.

8. The control apparatus according to claim 7, wherein the determining includes distributing the remaining radio resources on the basis of a ratio of the required margins for the plurality of schedulers.

9. The control apparatus according to claim 7, wherein the required margin is obtained by finding a sum of a required margin for one or more wireless terminals that use the corresponding slice in the cell.

10. The control apparatus according to claim 7, wherein the margin information indicates the required margin for each wireless terminal for the wireless terminal to use the corresponding slice.

11. The control apparatus according to claim 7, wherein the margin information indicates a coefficient value that is used to calculate the required margin for each wireless terminal for the wireless terminal to use the corresponding slice, and that is multiplied by an amount of radio resources required for each wireless terminal in the predetermined period.

12. The control apparatus according to claim 9, wherein the required margin for each wireless terminal is obtained on the basis of a priority level established for the slice used by the wireless terminal.

13. The control apparatus according to claim 9, wherein the required margin for each wireless terminal is obtained on the basis of an acceptable delay established for the slice used by the wireless terminal.

14. The control apparatus according to claim 9, wherein the required margin for each wireless terminal is obtained on the basis of a priority level established for an operator providing the scheduler that performs the scheduling for the wireless terminal.

15. The control apparatus according to claim 5, wherein the determining includes determining an overlapping margin for allocating some of the remaining radio resources among schedulers in an overlapping manner such that a total amount of margins allocated to the plurality of schedulers exceeds the remaining amount of radio resources.

* * * * *